(12) United States Patent
Omori

(10) Patent No.: US 9,395,181 B2
(45) Date of Patent: Jul. 19, 2016

(54) THREAD PROFILE MEASURING METHOD

(71) Applicant: MITUTOYO CORPORATION, Kawasaki-shi, Kanagawa (JP)

(72) Inventor: Yoshiyuki Omori, Kure (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 422 days.

(21) Appl. No.: 14/049,335

(22) Filed: Oct. 9, 2013

(65) Prior Publication Data

US 2014/0107973 A1    Apr. 17, 2014

(30) Foreign Application Priority Data

Oct. 11, 2012    (JP) .................. 2012-226060

(51) Int. Cl.
    *G01B 21/20*    (2006.01)
    *G01B 5/20*    (2006.01)

(52) U.S. Cl.
    CPC ............ *G01B 21/20* (2013.01); *G01B 5/204* (2013.01)

(58) Field of Classification Search
    USPC ........................................................ 702/167
    See application file for complete search history.

(56) References Cited

U.S. PATENT DOCUMENTS

| | | | |
|---|---|---|---|
| 2007/0240318 | A1 | 10/2007 | Matsumiya et al. |
| 2008/0246762 | A1* | 10/2008 | Ogata .................. G06T 17/10 345/420 |
| 2011/0164244 | A1* | 7/2011 | Honda .................. G01B 5/163 356/72 |

FOREIGN PATENT DOCUMENTS

| | | |
|---|---|---|
| DE | 19613173 | 10/1997 |
| DE | 19613175 | 10/1997 |
| JP | 06-185952 | 7/1994 |
| JP | 2001-082952 | 3/2001 |

OTHER PUBLICATIONS

Jaime Tejedor, Diagnosis and Imaging of Corneal Astigmatism, Published online Feb. 29, 2012, 17 pages.*
En Hong, Non-contact inspection of internal threads of machined parts, Int J Adv Manuf Technol (2012) 62:221-229 Published online: Dec. 8, 2011.*
Japanese Industrial standard Screw thread specification, 2002, 7 pages.*
European Search Report dated Jan. 23, 2014, 4 pages.

\* cited by examiner

*Primary Examiner* — Tung Lau
(74) *Attorney, Agent, or Firm* — Rankin, Hill & Clark LLP

(57) ABSTRACT

A method includes: performing a scanning measurement of a female thread along first and second axes extending along a center axis of the thread and opposed to each other across the center axis; determining characteristic values of the thread from contour data of the thread obtained through the measurement; obtaining the contour data including first contour data associated with the first axis and second contour data associated with the second axis by performing the measurement; detecting a thread displacement along the center axis between a crest associated with the first axis and a crest associated with the second axis at each of first position and second position on the center axis; calculating inclination and deviation of the first and second axes from the thread displacements detected at the first and second positions; and adjusting an attitude of the thread for the measurement to eliminate the inclination and deviation.

4 Claims, 21 Drawing Sheets

THREAD PROFILE MEASURING METHOD

The entire disclosure of Japanese Patent Applications No. 2012-226060 filed Oct. 11, 2012 is expressly incorporated by reference herein.

BACKGROUND OF THE INVENTION

1. Field of the Invention

The present invention relates to a thread profile measuring method of measuring a variety of characteristic values of a thread profile.

2. Description of Related Art

A thread profile of a threaded object (female thread=screw hole, male thread=screw shaft) is typically specified based on a variety of characteristic values (e.g., a thread pitch and a pitch diameter), which are defined for each type of threaded object in accordance with JIS (Japan Industrial Standard).

For instance, JISB0205 defines a variety of characteristic values of a general metric thread. The characteristic values of a thread profile are herein defined in relation to a thread contour seen in a cross section taken along a plane including the center axis of the thread profile.

Typically, a three-wire method has been frequently used for measurement of a thread profile. According to the three-wire method, which is defined in accordance with JISB0261 or the like, one measurement needle hung on one side of a screw shaft and two measurement needles hung on the other side are each set between thread crests and an outer dimension around these needles is measured with a micrometer or the like to calculate a pitch diameter of the thread profile or the like.

However, the three-wire method requires a complicated process for preparing the measurement needles, positioning the measurement needles on the thread profile, and performing measurement and/or calculation.

In view of the above, there is suggested a method of measuring a variety of characteristic values of a thread profile using a coordinate measuring machine (see Patent Literature 1: JP-A-2001-82952).

Patent Literature 1 describes that a scanning probe provided to the coordinate measuring machine is moved along the center axis of a thread profile for scanning measurement of a thread contour to obtain a variety of characteristic values of the thread profile. In particular, Patent Literature 1 describes that the scanning measurement using the scanning probe is performed at a plurality of points defined in a circumferential direction of the thread profile to obtain three-dimensional profile information on the thread profile, based on which the pitch diameter of the thread profile can be calculated and the three-axial position and inclination of the center axis of the thread profile can be measured.

However, since the measurement using the coordinate measuring machine has to be repeated at the plurality of points to measure the thread profile, the method as described in Patent Literature 1 necessarily requires complicated device and process.

In view of the above, in order to simplify a device and a process for measurement, a uniaxially movable profile measuring instrument is also used to measure a thread profile (see Patent Literature 2: JP-A-06-185952).

Patent Literature 2 describes that a scanning measurement axis of the profile measuring instrument is aligned with the center axis of the thread profile and the thread is traced with a stylus of the profile measuring instrument in such a manner that thread crests are sequentially overpassed to obtain the thread contour, the thread pitch and the like.

By performing the scanning measurement one time using the uniaxially movable profile measuring instrument as described in Patent Literature 2, it is only possible to obtain limited characteristic values, such as the thread contour and the thread pitch that are defined along the center axis of the thread profile, but the pitch diameter and the like seen in the cross section intersecting with the center axis cannot be obtained.

In view of the above, in order to also measure the pitch diameter of the thread profile, the scanning measurement may be performed using the uniaxially movable profile measuring instrument at each of opposite positions opposed to each other across the center axis of the thread profile.

However, when the scanning measurement is performed at each of the opposite positions in the thread profile, it is necessary to perform adjustments such as so-called "alignment" and "vertex detection" for accurately aligning the center axis of the thread profile with the scanning axis of the profile measuring instrument (moving axis or trace locus of the scanning measurement).

The alignment, which is also referred to as leveling, is an operation for adjusting the scanning axis and the center axis of the thread profile to be parallel to each other.

When the alignment fails to be accurately performed, in other words, when the moving axis of the scanning measurement is not parallel to the center axis of the thread profile with an inclination between these two axes, the measured thread contour is deformed and thus the characteristic values of the thread profile cannot be accurately obtained.

Incidentally, Patent Literature 2 also describes that an inclination between these axes results in an error in the thread contour and thus the orientation and position of the profile measuring instrument are adjusted to align these axes with each other. However, Patent Literature 2 fails to describe a specific process for such an adjustment or the like.

When, for instance, a thread profile of a male thread (i.e., a screw shaft), which inherently includes a cylindrical portion, is to be measured, a direction of the center axis can be obtained by detecting a generatrix of a surface of the cylindrical portion for the alignment.

However, when no cylindrical portion is formed or when the thread profile of a female thread (i.e., a screw hole) is to be measured, it is difficult to perform the alignment based on a detected generatrix and thus it is requisite to locate the center axis by a cut-and-try method, which makes the process significantly complicated.

The vertex detection, which is also referred to as a peak/bottom detection, is an operation for detecting a peak (an upper vertex) and a bottom (a lower vertex) of a thread profile in a cross section (a plane intersecting with the center axis) to locate opposite positions (two positions used to detect the diameter) opposed to each other across the center axis.

When the vertex detection fails to be accurately performed, irrespective of whether or not the above-described alignment is accurately performed, it is not possible to obtain an accurate thread contour and to accurately calculate the pitch diameter and the like.

For instance, for measuring a thread profile of a male thread (i.e., a screw shaft), the scanning measurement is performed at each of the uppermost position (peak) and the lowermost position (bottom) of the thread profile in a cross section (a plane intersecting with the center axis). A thread contour obtained at each position, which is considered to be identical with a contour seen in the cross section including the center axis of the thread profile, is congruent with a thread profile defined in accordance with JISB0205 or the like.

However, when the scanning measurement is performed at positions deviated from the mutually opposite positions in the cross section of the threaded object (i.e., in the plane intersecting with of the center axis) because of an inaccurate vertex detection, an obtained thread contour is different from an actual thread.

As described above, when the scanning measurement is performed at each of the opposite positions opposed to each other across the center axis of the thread profile using the uniaxially movable profile measuring instrument, complicated device and process as described in Patent Literature 1 can be simplified. However, such scanning measurement performed at the opposite positions in the thread profile disadvantageously requires a complicated process for the "alignment" and the "vertex detection".

SUMMARY OF THE INVENTION

An object of the invention is to provide a thread profile measuring method capable of accurately measuring a thread profile with simple device and process.

The inventor has found that an inclination and a deviation of the scanning axis from the center axis of a thread profile can be calculated by detecting a displacement between opposite thread crest and thread root, which face each other across the center axis, along the center axis at each of two points on the scanning axis during the scanning measurement of the thread profile. The invention is made based on this inventor's findings.

A principle of the invention is first described below.

FIG. 1 shows a threaded object S, which may be, for instance, a male thread or a female thread. An outer circumference of the male thread or an inner circumference of the female thread is schematically shown by a cylindrical shape in FIG. 1. The threaded object S has a center axis C and a plane PC including the center axis C is defined.

For performing scanning measurement of the threaded object S as described above using the uniaxially movable profile measuring instrument, a scanning axis T (including a lower scanning axis T1 and an upper scanning axis T2 located at opposite positions opposed to each other across the center axis C) is located along the center axis C.

When the threaded object S is a female thread, a stylus, which is inserted in the threaded object S, is downwardly applied to the inner side of the threaded object S for scanning measurement along the lower scanning axis T1, while the stylus is upwardly applied to the inner side of the threaded object S for scanning measurement along the upper scanning axis T2.

When the threaded object S is a male thread, the stylus, which is set below the threaded object S, is upwardly applied to the outer side of the threaded object S for scanning measurement along the lower scanning axis T1, while the stylus is downwardly applied to the outer side of the threaded object S for scanning measurement along the upper scanning axis T2.

The scanning measurement performed along the scanning axis T1 and the scanning measurement performed along the scanning axis T2 are both based on a movement of the same profile measuring instrument, so that moving axes, i.e., the scanning axis T (T1 and T2), are aligned in the same direction. As long as the scanning axis T (T1 and T2) is parallel to the center axis C, a plane PT defined by the scanning axis T (T1 and T2) coincides with the above-described plane PC including the center axis C.

Assuming that the threaded object S is improperly set relative to the profile measuring instrument with an inclination and an axis deviation between the scanning axis T and the center axis C, the plane PT is deviated from the plane PC to intersect with the threaded object S at a position different from a position where the plane PC intersects with the threaded object S, so that a different contour of the threaded object S is provided along the plane PT.

FIGS. 2, 3 and 4 show a condition where the plane PT coincides with the plane PC with the scanning axis T and the center axis C being aligned.

As shown in FIG. 2, in a planar shape of the threaded object S (XY plane), the scanning axis T and the plane PT coincide with the center axis C of the threaded object S and the plane PC, respectively, and pass through the center of the threaded object S.

As shown in FIG. 3, in a cross section intersecting with the center axis C of the threaded object S (YZ plane), the plane PT coincides with the plane PC and extends from the lowermost end of the threaded object S (corresponding to the scanning axis T1) to the uppermost end of the threaded object S (corresponding to the scanning axis T2) through the center axis C, so that the scanning axes T1 and T2 in combination show a diameter D of the threaded object S (in this case, an outside diameter).

As shown in FIG. 4, when the plane PT and the plane PC coincide with each other, contours F1 and F2 obtained along the scanning axes T1 and T2 (ZX plane) each show a thread profile of the threaded object S (a cross section of the thread taken along the planes PT and PC).

As shown in FIG. 4, at two points (P1, P2) spaced from each other at a predetermined interval along the center axis C of the threaded object S, opposite portions of the thread facing each other across the center axis C are deviated from each other by half of a thread pitch (i.e., the opposite portions become thread crest and thread root).

In addition, depending on an inclination or an axis deviation of the scanning axis T (T1 and T2) from the center axis of the thread profile, the opposite portions facing each other across the center axis C at the two points (P1 and P2) are each displaced in a direction of the center axis C.

FIGS. 5, 6 and 7 show a condition where the scanning axis T and the center axis C, i.e., the plane PT and the plane PC, are deviated.

As shown in FIG. 5, in a planar shape of the threaded object S (XY plane), the scanning axis T and the plane PT are parallel to the center axis C and the plane PC passing through the center of the threaded object S but are deviated therefrom by a deviation dY.

As shown in FIG. 6, in a cross section intersecting with the center axis C of the threaded object S (YZ plane), the plane PT is deviated from the plane PC by the deviation dY and thus the scanning axes T2 and T1 do not pass through the uppermost end and the lowermost end of the threaded object S, respectively, so that the diameter D (a pitch diameter) of the threaded object S cannot be shown by the scanning axes T2 and T1.

As shown in FIG. 7, because of such an axis deviation, each of the contours F1 and F2 shown on the scanning axes T1 and T2 (ZX plane) is deformed from the actual thread profile of the threaded object S (the contours F1, F2 shown in FIG. 4).

In particular, the corresponding positions on the contours F1 and F2 (the positions of the thread crest and the thread root opposed to each other across the center axis C) are each deviated along the center axis C at the two points (P1 and P2) on the center axis C.

As shown in FIG. 5, at each of the points P1 and P2 in the plane PC, the thread crest and thread root of the threaded object S on the upper and lower sides are aligned with each other (the contours F1 and F2 shown in FIG. 4).

On the other hand, as shown in FIGS. 5 and 7, at each of the points P1 and P2 in the plane PT, the thread crest on the lower side (the contour F1 shown in FIG. 7) and the thread root on the upper side (the contour F2 shown in FIG. 7) are displaced from each other in the direction of the center axis C by dX1 or dX2.

Since the plane PC and the plane PT are deviated from each other by the deviation dY, the displacement dX1 at the point P1 is equal to the displacement dX2 at the point P2.

In other words, the equal displacements dX1 and dX2 at the two points P1 and P2 depend on the deviation dY between the plane PC and the plane PT.

FIGS. 8 and 9 show a condition where the scanning axis T and the center axis C, i.e., the plane PT and the plane PC, are inclined from each other.

As shown in FIG. 8, in a planar shape of the threaded object S (XY plane), while intersecting with each other at a vertical straight line passing through, for instance, the point P1, the scanning axis T (the plane PT) and the center axis C (the plane PC) are inclined from each other by an angle θ (an inclination).

As shown in FIG. 9, because of such an inclination, the contours F1 and F2 (ZX plane) obtained along the scanning axes T1 and T2 are further deformed from the actual thread profile of the threaded object S (the contours F1 and F2 shown in FIG. 4) at a position remoter from the intersecting position (e.g., the point P1).

While the corresponding positions on the contours F1 and F2 (the positions of the thread crest and the thread root opposed to each other across the center axis) coincide with each other at the intersecting point, i.e., the point P1 (in other words, the displacement dX1=0), the positions of the thread crest and the thread root on the scanning axes T1 and T2 are displaced from each other (the displacement dX2) along the center axis at the point P2, which is spaced from the point P1. Incidentally, when the intersecting point is not the point P1, the displacement dX1 between the thread crest and the thread root at the point P1 is not zero, either.

The displacements dX1 and dX2 depend on the inclination between the plane PC and the plane PT (the inclination θ), so that the inclination θ can be calculated from a difference between the displacements dX1 and dX2 at the two points P1 and P2.

The inclination θ is calculated from a difference between the displacements dX1 and dX2 at the two points P1 and P2 as described above, while the deviation dY can be calculated from a component common to the displacements dX1 and dX2.

Actually, the inclination and axis deviation of the moving axis (the scanning axis) for scanning measurement from the center axis are mixed up, but it is possible to separate each component by calculating a difference and an average between the displacements dX1 and dX2.

Based on the above-described principle, an arrangement according to the invention includes: performing scanning measurement along each of scanning axes including a first axis (the scanning axis T1) and a second axis (the scanning axis T2) to obtain contour data (the contours F1 and F2) in advance; detecting the displacements dX1 and dX2 in the direction of the center axis C between the thread crest (or the thread root) of the contour taken along the first axis and the thread crest (or the thread root) of the contour along the second axis at the two points (P1 and P2) on the center axis C; and calculating the inclination θ and the deviation dY of the axis T (T1 and T2) from the center axis C based on the detected thread displacement at the two points.

Specifically, according to an invention, the following arrangement is provided.

According to an aspect of the invention, a thread profile measuring method includes: performing a scanning measurement of a thread profile along a first axis and a second axis extending along a center axis of the thread profile and opposed to each other across the center axis; determining a characteristic value of the thread profile from contour data of the thread profile obtained through the scanning measurement; obtaining the contour data including a first contour data associated with the first axis and a second contour data associated with the second axis by performing the scanning measurement; detecting a thread displacement along the center axis between a crest associated with the first axis and a crest associated with the second axis at each of a first position and a second position on the center axis; calculating an inclination and a deviation of the first axis and the second axis from the thread displacement detected at the first position and the thread displacement detected at the second position; and adjusting an attitude of the thread profile for the scanning measurement to eliminate the inclination and the deviation.

In the above aspect, a uniaxially movable profile measuring instrument such as a contour measuring instrument is preferably usable for the scanning measurement. However, in place of the profile measuring instrument, a coordinate measuring machine may be used for the scanning measurement performed through a uniaxial movement. Further, a contour of the thread profile may be optically measured. In addition to the above alternatives, any arrangement may be employable as long as the scanning measurement is performed along each of the first axis and the second axis opposed to each other across the center axis of the thread profile to provide a precise contour.

In the above aspect, based on the first contour data associated with the first axis and the second contour data associated with the second axis obtained through the scanning measurement, it is possible to obtain an axial displacement of a thread crest on each of the axes (a thread root on the opposite axis) at each of the first position and the second position. Subsequently, an inclination component is extracted from a difference between the displacements at the first position and the second position to calculate the inclination. Additionally, the displacements at the first position and the second position are averaged to extract a common axis-deviation component for calculating the deviation.

For calculating the inclination and the deviation, a geometric approximation or the like may be included as needed to further simplify the process depending on a required accuracy. In contrast, an exact calculation of the inclination and the deviation results in an enhanced calculation accuracy. Such accuracy may be determined depending on a required accuracy in measurement of the thread profile, so that it is possible to appropriately change a balance between simplification of the device and process and improvement of the accuracy of the device and process.

Incidentally, the accuracy can be more improved by adjusting the attitude of the thread profile relative to the profile measuring instrument or the like based on the calculation results of the inclination and the deviation obtained after the scanning measurement is performed one time, and then again performing the scanning measurement, calculating the inclination and the deviation and/or adjusting the attitude. Additionally, the accuracy can be further improved by repeating such a process as described above.

It is preferable that the thread profile measuring method of the above aspect further includes trigonometrically calculating the inclination and the deviation using the thread displacements, a distance between the first position and the second position, and a thread lead angle of the thread profile.

For instance, the deviation dY can be calculated by dY=(dX1+dX2)/4 tan β, in which dX1 and dX2 denote the thread displacements, L denotes the distance and β denotes the thread lead angle.

The inclination θ can be derived from a relation of L=tan θ=(dY1−dY2), in which dX1 and dX2 denote the thread displacements and L denotes the distance.

According to the aspect of the invention, the standard thread lead angle β for the thread profile can be used for trigonometry to easily calculate the inclination and the deviation.

It is preferable that the thread profile measuring method of the above aspect further includes repeating the obtaining of the contour data, the calculating of the inclination and the deviation and the adjusting of the attitude of the thread profile until a requirement is satisfied, in which the requirement includes any one of whether or not an accuracy of the inclination and the deviation reaches a desired level, whether or not the obtaining, the calculating and the adjusting are repeated for a predetermined number of times or more, and whether or not an operator requests termination.

With the above arrangement, since the scanning measurement, the calculation of the inclination and the deviation, and/or the adjustment of the attitude are repeated, it is possible to improve the accuracy depending on the requirement.

In the above aspect, it is preferable that the scanning measurement is performed on the thread profile using a profile measuring instrument including a swingable arm, the arm includes a pair of styluses provided on opposite sides in a swinging direction, and the profile measuring instrument is adapted to perform the scanning measurement along the first axis and the second axis with the styluses.

With the above arrangement, since the styluses are provided on the opposite sides, it is possible to perform the scanning measurement along each of the first axis and the second axis without, for instance, turning around the thread profile or the profile measuring instrument.

For instance, when the scanning measurement is performed by a profile measuring instrument whose arm is provided with only one stylus on one side in a swinging direction, it is required to turn around a thread profile to be measured (and an object provided with the thread profile) after scanning measurement is performed along the first axis and before scanning measurement is performed along the second axis, or to turn around the stylus to invert the contact direction.

In contrast, with the profile measuring instrument provided with the pair of styluses provided on the opposite sides, scanning measurement can be performed bi-directionally in the swinging direction and thus it is not required to turn around the thread profile or the profile measuring instrument.

DESCRIPTION OF EMBODIMENT(S)

An embodiment of the invention will be described below with reference to the drawings.

Figure 18:
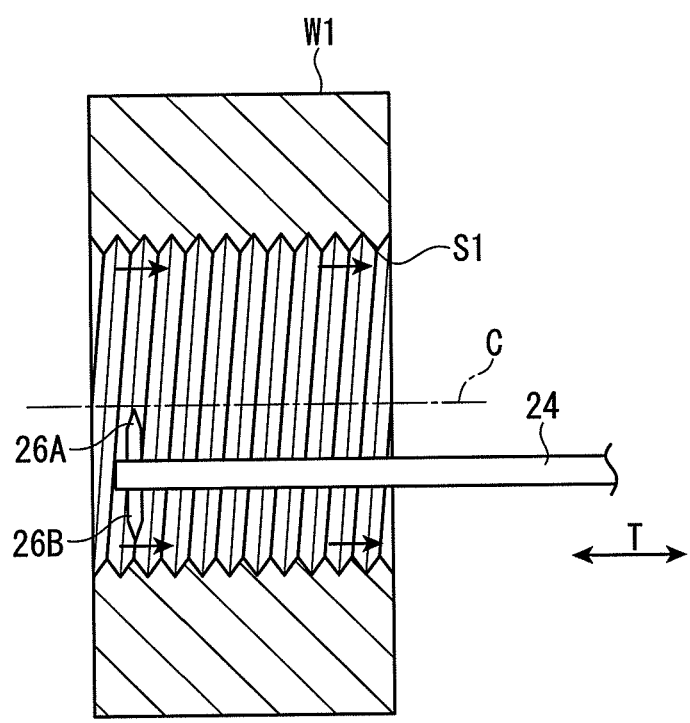
FIG. 18 is a sectional view showing an example where internal upper and lower surfaces of a female thread are subjected to a scanning measurement according to the exemplary embodiment.
Figure 19:
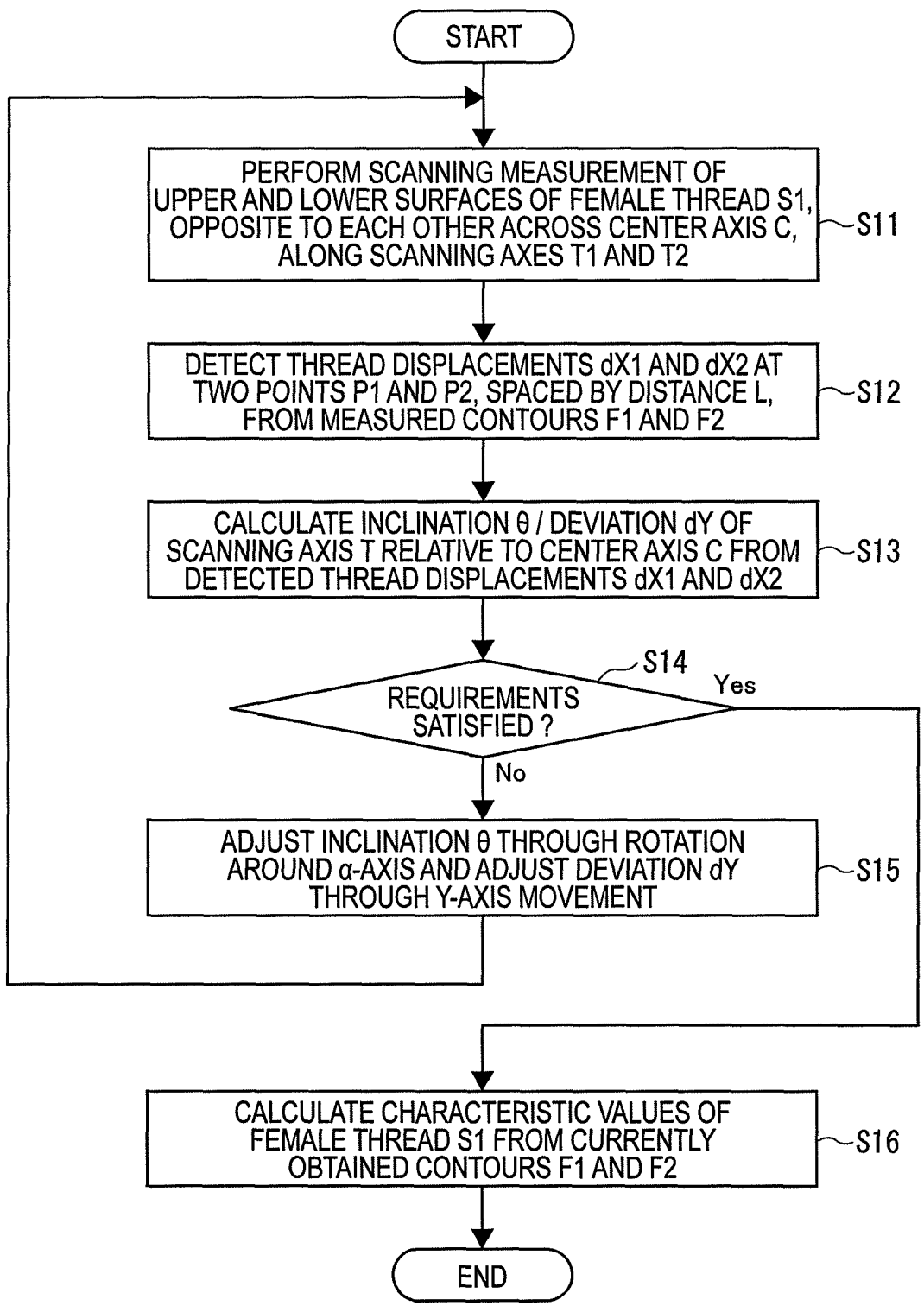
FIG. 19 is a flow chart showing a process according to the exemplary embodiment.
Figure 20:
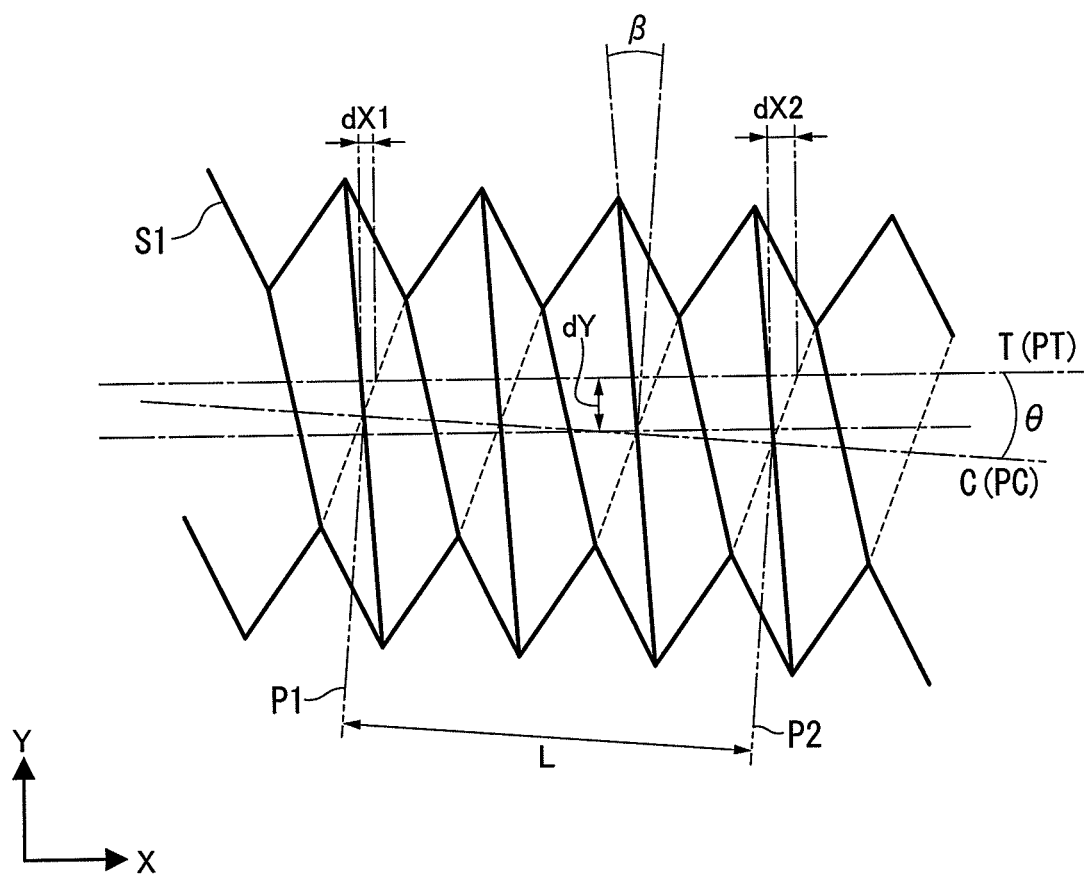
FIG. 20 shows the scanning measurement according to the exemplary embodiment.
Figure 21:
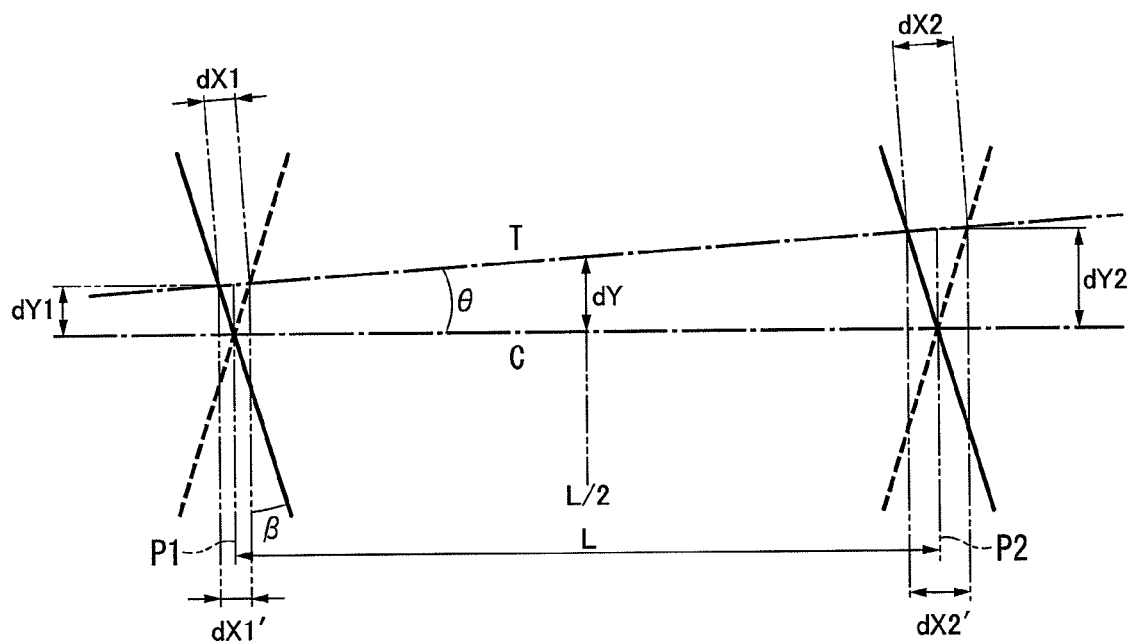
FIG. 21 shows a calculation process according to the exemplary embodiment.

In the exemplary embodiment, for a thread-profile measurement of a female thread S1 (a threaded object) (see FIG. 18), a surface texture measuring instrument (a uniaxially movable profile measuring instrument) is used (see FIGS. 10 to 17) and a process according to the invention is performed (see FIGS. 19 to 21).

The surface texture measuring instrument will be first described below and the process according to the invention will be subsequently described.

Arrangement of Surface Texture Measuring Instrument

Figure 10:
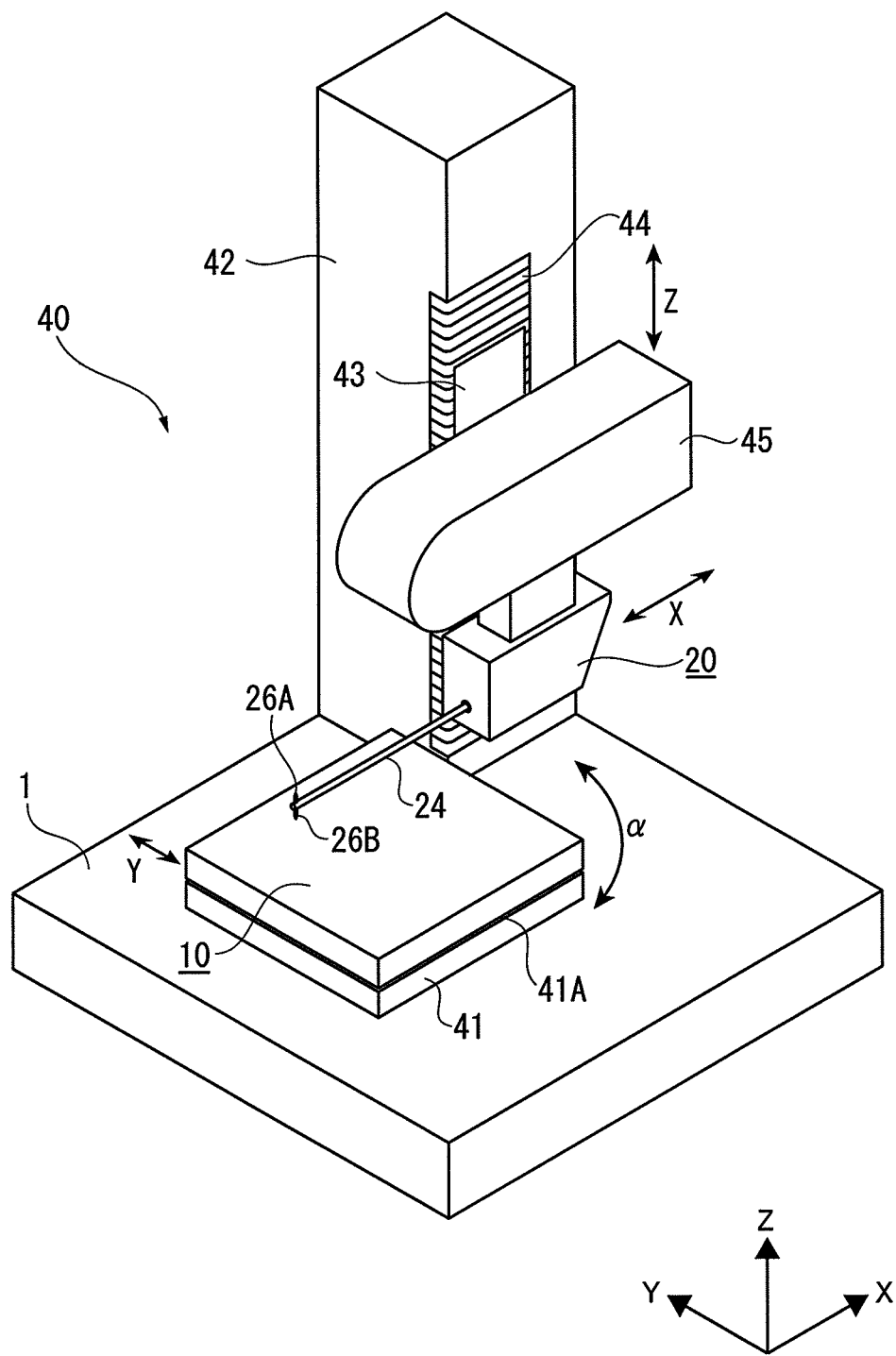
FIG. 10 is a perspective view showing a profile measuring instrument according to an exemplary embodiment of the invention.

As shown in FIG. 10, a surface texture measuring instrument used in the exemplary embodiment of the invention includes: a base 1; a stage 10 that is mounted on the base 1 and has an upper surface on which an object to be measured is mounted; a stylus-displacement detector 20 having styluses 26A and 26B that are brought into contact with a surface of the object; and a relative movement mechanism 40 that enables relative movement between the stylus-displacement detector 20 and the stage 10.

The relative movement mechanism 40 includes: a Y-axis driving mechanism 41 that is located between the base 1 and the stage 10 and moves the stage 10 in a horizontal direction (Y-axis direction); a rotation drive mechanism 41A that is located between the base 1 and the stage 10 and moves the stage 10 around a Z-axis (in an α-direction); a column 42 that stands upright from an upper surface of the base 1; a Z-slider 43 that is provided to the column 42 movably in a vertical direction (Z-axis direction); a Z-axis driving mechanism 44 that moves the Z-slider 43 in the vertical direction; and an X-axis driving mechanism 45 that is provided to the Z-slider 43 and moves the stylus-displacement detector 20 in a direction (X-axis direction) perpendicular to the moving direction of the stage 10 (Y-axis direction) and the moving direction of the Z-slider 43 (Z-axis direction).

In other words, the relative movement mechanism 40 is provided by a combination of a three-dimensional movement mechanism, which includes the Y-axis driving mechanism 41 that moves the stage 10 in the Y-axis direction, the Z-axis driving mechanism 44 that moves the stylus-displacement detector 20 in the Z-axis direction and the X-axis driving mechanism 45 that moves the stylus-displacement detector 20 in the X-axis direction, and the rotation drive mechanism 41A that moves the stage 10 around the Z-axis (in the α-direction).

Each of the Y-axis driving mechanism 41 and the Z-axis driving mechanism 44 is provided by, for instance, a feed screw mechanism (not shown) that includes a ball screw shaft and a nut member screwed to the ball screw shaft.

The rotation drive mechanism 41A includes a bearing mechanism located between the Y-axis driving mechanism 41 and the stage 10 and a motor used to rotate the stage 10.

Figure 11:
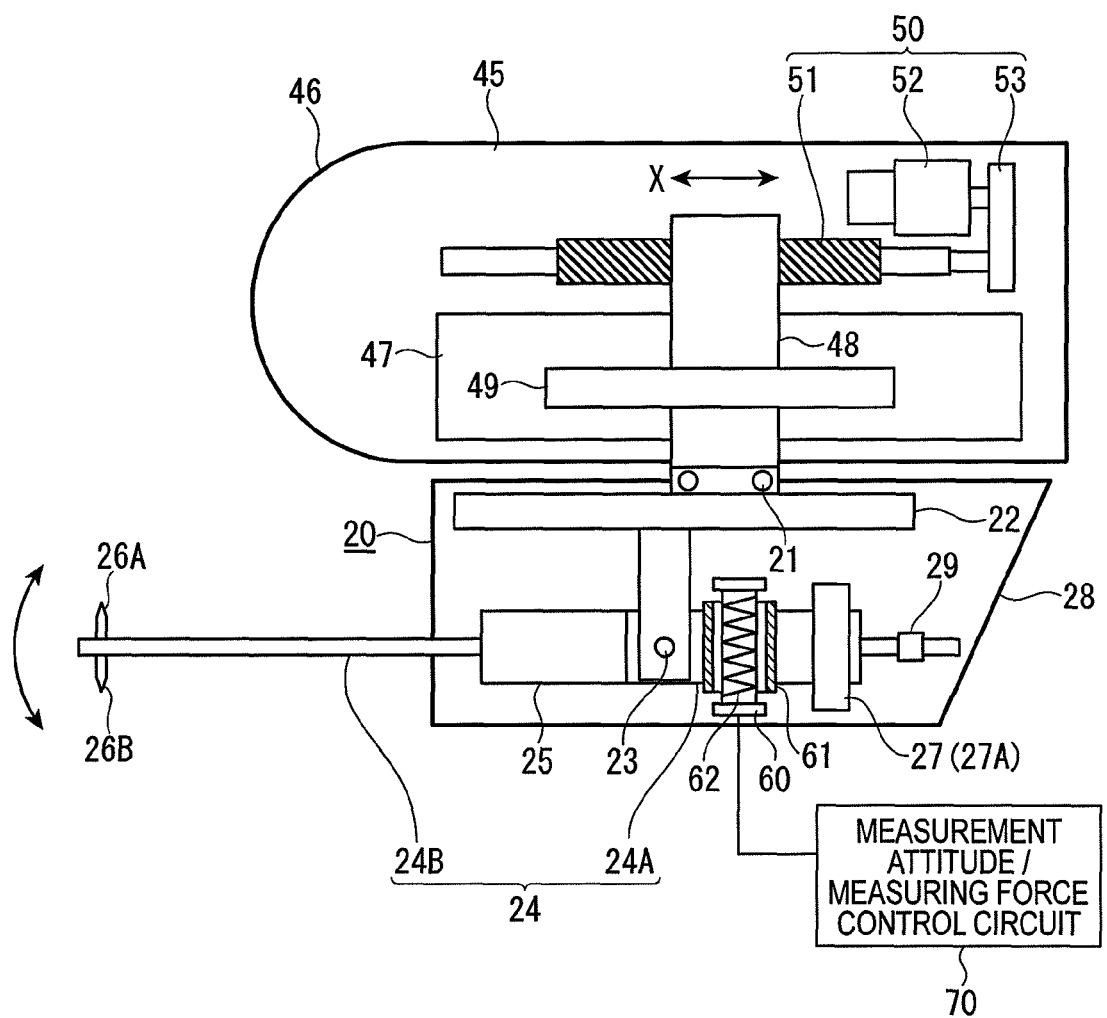
FIG. 11 shows an X-axis driving mechanism and a stylus-displacement detector of the profile measuring instrument according to the exemplary embodiment.

As shown in FIG. 11, the X-axis driving mechanism 45 includes: a driving mechanism body 46 that is fixed to the Z-slider 43; a guide rail 47 that is provided to the driving mechanism body 46 in parallel to the X-axis direction; an X-slider 48 that is movable in the X-axis direction along the guide rail 47; an X-axis position detector 49 that detects a position of the X-slider 48 in the X-axis direction; and a feed mechanism 50 that moves the X-slider 48 along the guide rail 47.

The feed mechanism 50 includes: a feed screw shaft 51 that is provided to the driving mechanism body 46 in parallel to the guide rail 47 and is screwed in the X-slider 48; a motor 52 (driving source); and a rotation transmitting mechanism 53 that transmits rotation of the motor 52 to the feed screw shaft 51. The rotation transmitting mechanism 53 is provided by a mechanism such as a gear train, a belt or a pulley.

As shown in FIG. 11, the stylus-displacement detector 20 includes: a bracket 22 (a body) that is detachably suspended from the X-slider 48 via a bolt 21 and is supported by the X-slider 48; a measurement arm 24 that is supported by the bracket 22 swingably in the vertical direction (movably in a circular movement) around a rotary shaft 23 (a support shaft); a pair of styluses 26A and 26B provided at an end of the measurement arm 24; a displacement detector 27 that detects a circular movement amount (displacement in the Z-axis direction) of the measurement arm 24; a counterweight 29 that is adjustably positioned on the measurement arm 24; a measurement-arm attitude switching mechanism 60 that switches an attitude of the measurement arm 24 between a first attitude where the measurement arm 24 is biased in one direction (the upward direction) of the circular movement and a second attitude where the measurement arm 24 is biased in the other direction (the downward direction) of the circular movement; and a casing 28 that houses the bracket 22, the measurement arm 24, the displacement detector 27, the counterweight 29 and the measurement-arm attitude switching mechanism 60.

The measurement arm 24 includes: a first measurement arm 24A that is supported by the bracket 22 movably in a vertical direction of the circular movement around the rotary shaft 23; and a second measurement arm 24B that is exchangeably attached to an end of the first measurement arm 24A via an attachment-detachment mechanism 25. The attachment-detachment mechanism 25 connects the first measurement arm 24A to the second measurement arm 24B in alignment with each other.

The styluses 26A and 26B project from the second measurement arm 24B in circular movement directions. In other words, the stylus 26A projects perpendicularly upward from the second measurement arm 24B and the stylus 26B projects perpendicularly downward from the second measurement arm 24B.

Incidentally, each of the styluses 26A and 26B may be provided by a stylus subjected to a DLC (Diamond-Like Carbon) coating or a stylus subjected to a friction-reducing process to have, for instance a polished surface. Depending on control by a later-described measurement attitude/measuring force control circuit 70, a measuring force may be different between when the measurement arm 24 is biased in one direction (e.g., the upward direction) along the circular movement direction and when the measurement arm 24 is biased in the other direction (the downward direction), so that, for instance, the stylus may be unexpectedly slightly caught to be broken. However, the stylus subjected to the friction-reducing process as described above can be prevented from such a breakage.

Figure 12:
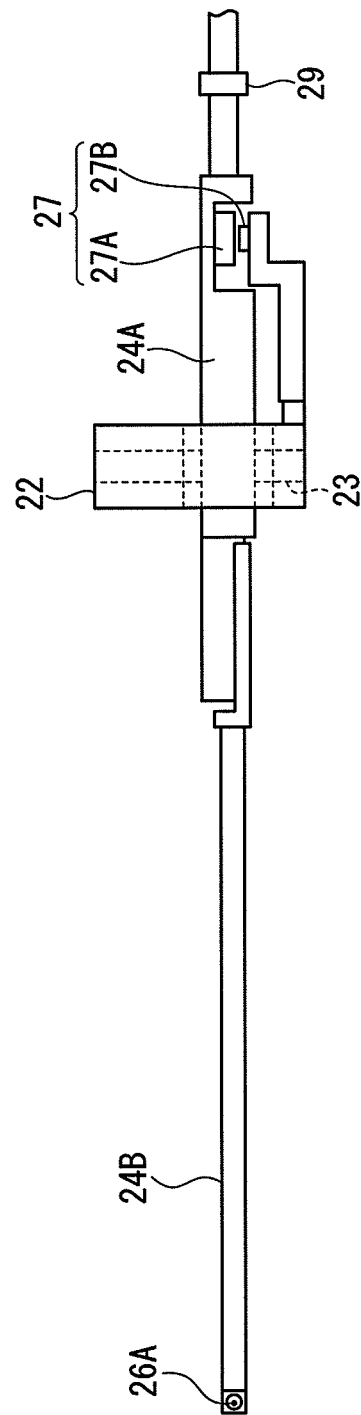
FIG. 12 is a plan view showing a relationship between a measurement arm and a displacement detector of the profile measuring instrument according to the exemplary embodiment.

As shown in FIG. 12, the displacement detector 27 is provided along a range of the circular movement and includes a position detector that outputs pulse signals of a number corresponding to the circular movement amount of the measurement arm 24. Specifically, the displacement detector 27 includes a scale 27A that is provided to the measurement arm 24 and is curved in the circular movement directions of the measurement arm 24; and a detection head 27B that is attached to the bracket 22 (the body) to face the scale 27A. A detecting surface of the scale 27A is on the axis of the measurement arm 24 and on a plane of the circular movement of the measurement arm 24. This arrangement allows the detecting surface of the scale 27A, the measurement arm 24 and ends of the styluses 26A and 26B to be coaxially located.

A position of the counterweight 29 is adjustable in the axial direction of the measurement arm 24 such that the weight on a side of the first measurement arm 24A and the weight on a side of the second measurement arm 24B are balanced around the rotary shaft 23. Specifically, the counterweight 29 is fixed to the measurement arm 24 at a desired position by a setscrew. Alternatively, the measurement arm 24 may be externally threaded to provide a male thread. The counterweight 29 may be screwed to the male thread so as to adjust its position.

Figure 13:
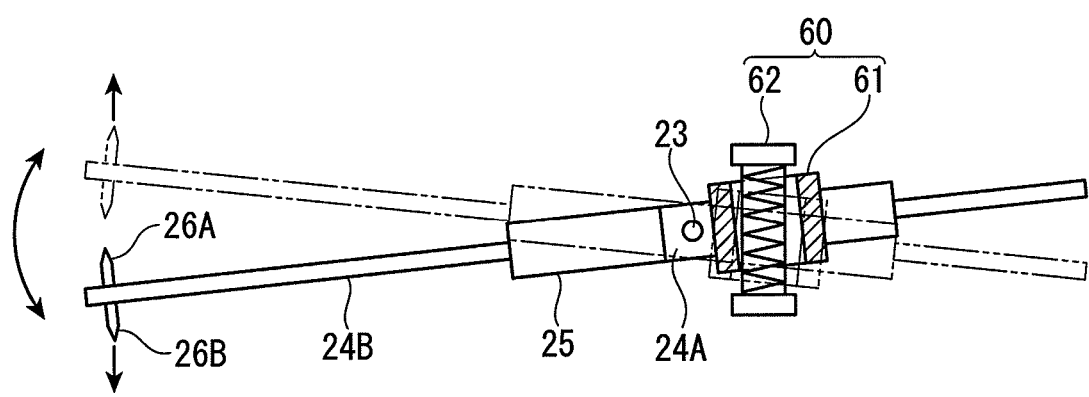
FIG. 13 shows the measurement arm and a measurement-arm attitude switching mechanism of the profile measuring instrument according to the exemplary embodiment.

As shown in FIG. 13, the measurement-arm attitude switching mechanism 60 includes: a cylindrical magnet 61 in the middle of the first measurement arm 24A; and a voice coil 62 that is fixed to the bracket 22 (the body) to penetrate the magnet 61 and biases the measurement arm 24 in one direction (the upward direction) of the circular movement around the rotary shaft 23 and in the other direction (the downward direction) thereof. The measurement-arm attitude switching mechanism 60 is controlled by a command from the measurement attitude/measuring force control circuit 70.

When electric current flows into the voice coil 62 in response to the command of the measurement attitude/measuring force control circuit 70, the magnet 61 of the measurement arm 24 is attracted to the voice coil 62 by an electromagnetic force generated by the voice coil 62 and a magnetic force of the magnet 61, so that an attitude of the measurement arm 24 is switched to an attitude where the end of the measurement arm 24 is biased upward or to an attitude where the end of the measurement arm 24 is biased downward.

The measurement-arm attitude switching mechanism 60 includes the voice coil 62 biasing the measurement arm 24 in the circular movement directions around the rotary shaft 23 (the fulcrum) and also serves as a measuring force applier that applies a measuring force to the styluses 26A and 26B by biasing the measurement arm 24 in the circular movement directions.

Figure 14:
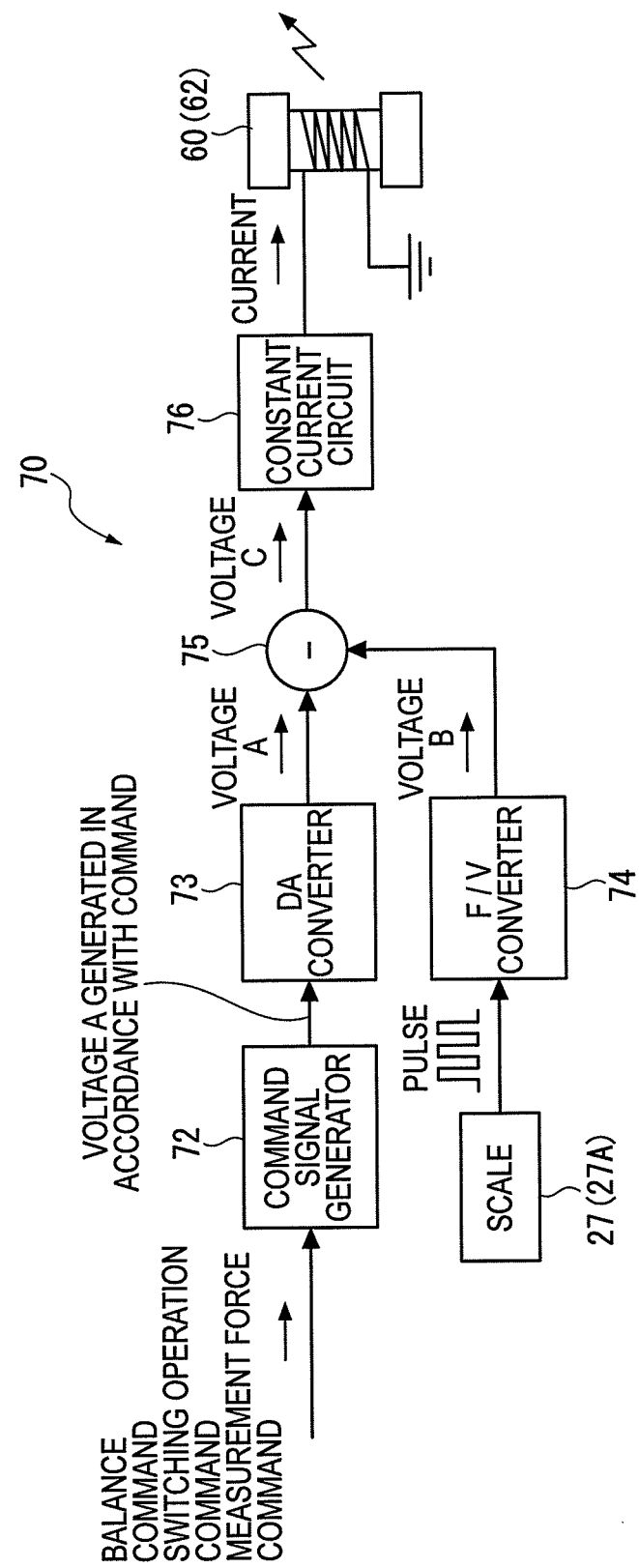
FIG. 14 shows a measurement attitude/measuring force control circuit of the profile measuring instrument according to the exemplary embodiment.

As shown in FIG. 14, the measurement attitude/measuring force control circuit 70 includes: a command signal generator 72 that is provided by CPU and the like and generates a voltage A (a command speed signal) corresponding to a predetermined speed in accordance with a balance command, a switching operation command (an upward switching operation command or a downward switching operation command) and a measurement force command which are outputted from a later-described controller 101; a digital/analog converter 73 that converts the voltage A (a digital signal) from the command signal generator 72 into an analog signal; a frequency/voltage converter 74 as a measurement-arm speed detector that outputs a voltage B (an operation speed signal) corresponding to an operation speed of the measurement arm 24 based on a pulse signal (frequency) from the displacement detector 27; a subtractor 75 as a difference output unit that outputs a differential voltage C as a difference between the command speed signal (the voltage A) and the operation speed signal (the voltage B); and a constant current circuit 76 that converts the differential voltage C from the subtractor 75 into electric current and supplies the electric current to the voice coil 62 of the measurement-arm attitude switching mechanism 60. With this arrangement, the circular movement of the measurement arm 24 can be performed while the operation speed of the measurement arm 24 is kept at a predetermined speed or lower.

Here, the voltage A (command speed signal) generated from the command signal generator 72 is set at a speed such that the styluses 26A and 26B or the object are not damaged when the styluses 26A and 26B are brought into contact with the object.

Figure 15:
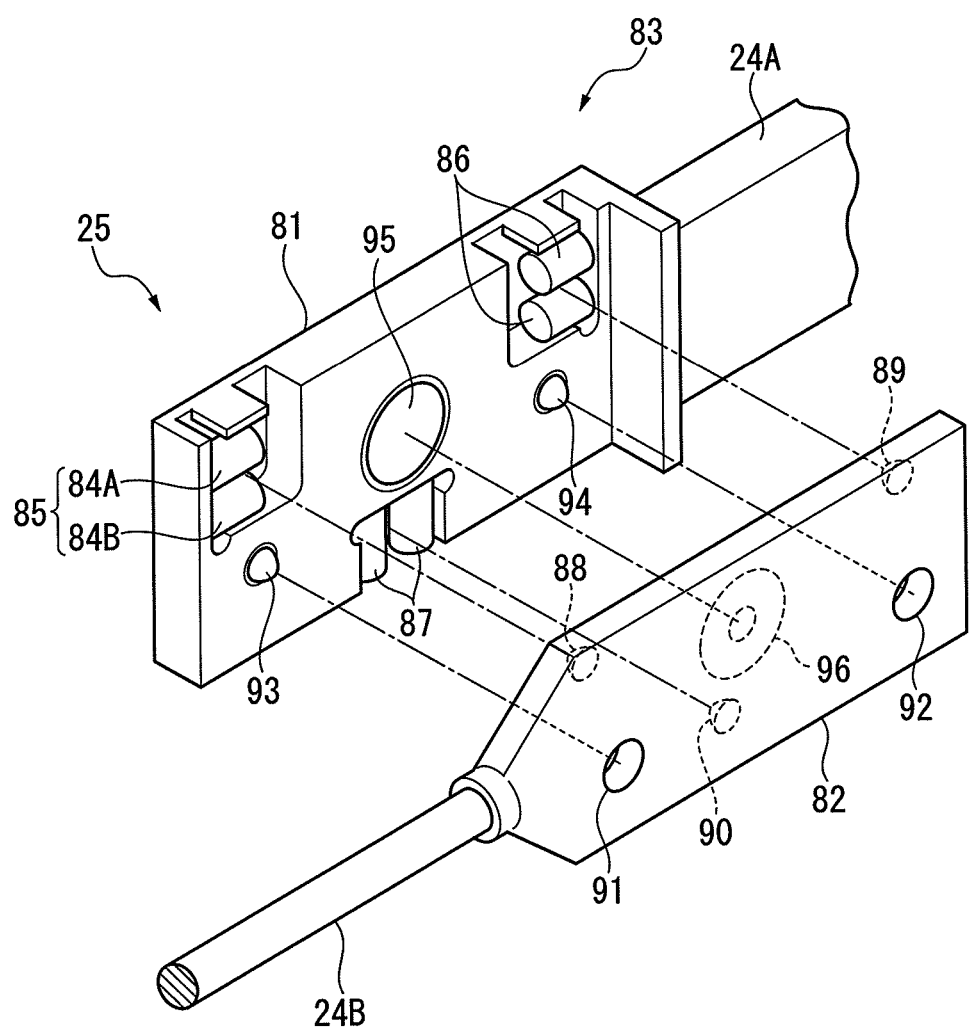
FIG. 15 is an exploded perspective view showing an attachment-detachment mechanism of the profile measuring instrument according to the exemplary embodiment.

As shown in FIG. 11, the attachment-detachment mechanism 25 is located in the casing 28. As shown in FIG. 15, the attachment-detachment mechanism 25 includes: a rectangular first plate 81 that is provided to the end of the first measurement arm 24A; a rectangular second plate 82 that is provided to a base end of the second measurement arm 24B; a positioning mechanism 83 that positions the second plate 82 at a predetermined position relative to the first plate 81 when placing the second plate 82 to face the first plate 81; a magnet 95 provided on the first plate 81; and a magnetic material 96 that is provided on the second plate 82 and is attracted by the magnet 95.

The positioning mechanism 83 includes: a first seat 85 including a pair of cylindrical positioning members 84A and 84B that are arranged in parallel to the axial direction of the measurement arm 24 and are spaced from each other at a predetermined interval; a second seat 86 including a pair of cylindrical positioning members 84A and 84B that are arranged in parallel to the axial direction of the measurement arm 24 and are spaced from the first seat 85 in the axial direction of the measurement arm 24; a third seat 87 including a pair of cylindrical positioning members 84A and 84B that are perpendicular to the axial direction of the measurement arm 24 and are spaced from each other at a predetermined interval; engagement balls 88, 89 and 90 that respectively correspond to the first seat 85, the second seat 86 and the third seat 87 to be respectively engageable with and disengageable from the first seat 85, the second seat 86 and the third seat 87; at least two engagement holes 91 and 92; and at least two engagement pins 93 and 94 that are respectively engaged with the engagement holes 91 and 92.

The first seat 85, the second seat 86, the third seat 87 and the engagement pins 93 and 94 are arranged on the first plate 81. Specifically, the first seat 85 and the second seat 86 are arranged on both ends of the first plate 81 that are spaced in the axial direction of the measurement arm 24. The third seat 87 is arranged lower than and between the first seat 85 and the second seat 86. The engagement pins 93 and 94 are respectively arranged beneath the first seat 85 and the second seat 86. The magnet 95 is surrounded by the first, second and third seats 85, 86 and 87.

The engagement balls 88, 89 and 90 and the engagement holes 91 and 92 are arranged on the second plate 82. In other words, when the second plate 82 is positioned at a predetermined position relative to the first plate 81; the engagement balls 88, 89 and 90 are arranged to respectively correspond to the first, second and third seats 85, 86 and 87 of the first plate 81; the engagement holes 91 and 92 are arranged to respectively correspond to the engagement pins 93 and 94; and the magnetic material 96 is arranged to correspond to the magnet 95.

When the second plate 82 is positioned at the predetermined position relative to the first plate 81, each of the engagement balls 88, 89 and 90 is arranged to fit between the cylindrical positioning members 84A and 84B of the associated one of the seats while being in contact therewith.

The pairs of cylindrical positioning members 84A and 84B of the first, second and third seats 85, 86 and 87 and the engagement balls 88, 89 and 90 are formed of a conductive material.

Figure 16:
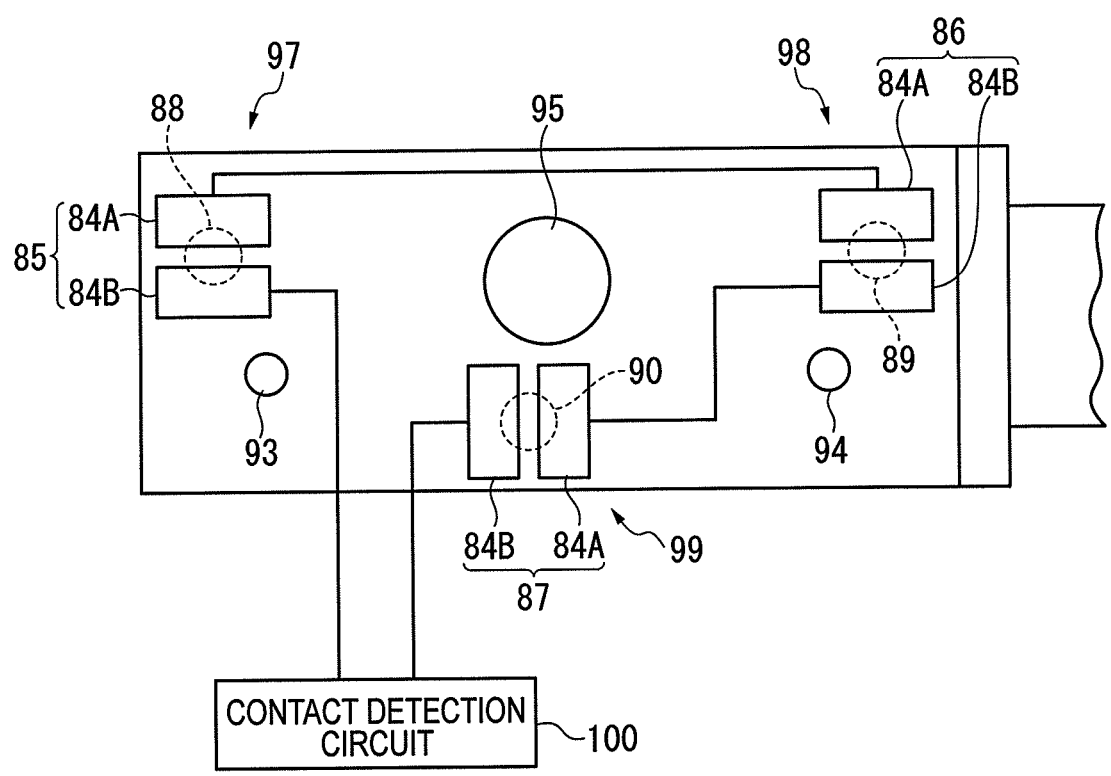
FIG. 16 shows a contact detection circuit of the profile measuring instrument according to the exemplary embodiment.

As shown in FIG. 16, seat sensors 97, 98 and 99 are configured such that the seat sensors 97, 98 and 99 are closed when the pairs of cylindrical positioning members 84A and 84B of the first, second and third seats 85, 86 and 87 are in contact with the engageable/disengageable engagement balls 88, 89 and 90 while the seat sensors 97, 98 and 99 are opened when the pairs of cylindrical positioning members 84A and 84B are separated from the engagement balls 88, 89 and 90. The seat sensors 97, 98 and 99 are connected to each other in series and connected to a contact detection circuit 100.

The contact detection circuit 100 detects opening/closing of the seat sensors 97, 98 and 99 and notifies the opening/closing by ON/OFF of a lamp, display on a display section or a sound of a buzzer or the like.

A projecting amount of each of the engagement pins 93 and 94 is set such that the magnetic material 96 is attracted by the magnet 95 after the engagement pins 93 and 94 start to be engaged with the engagement holes 91 and 92.

Figure 17:
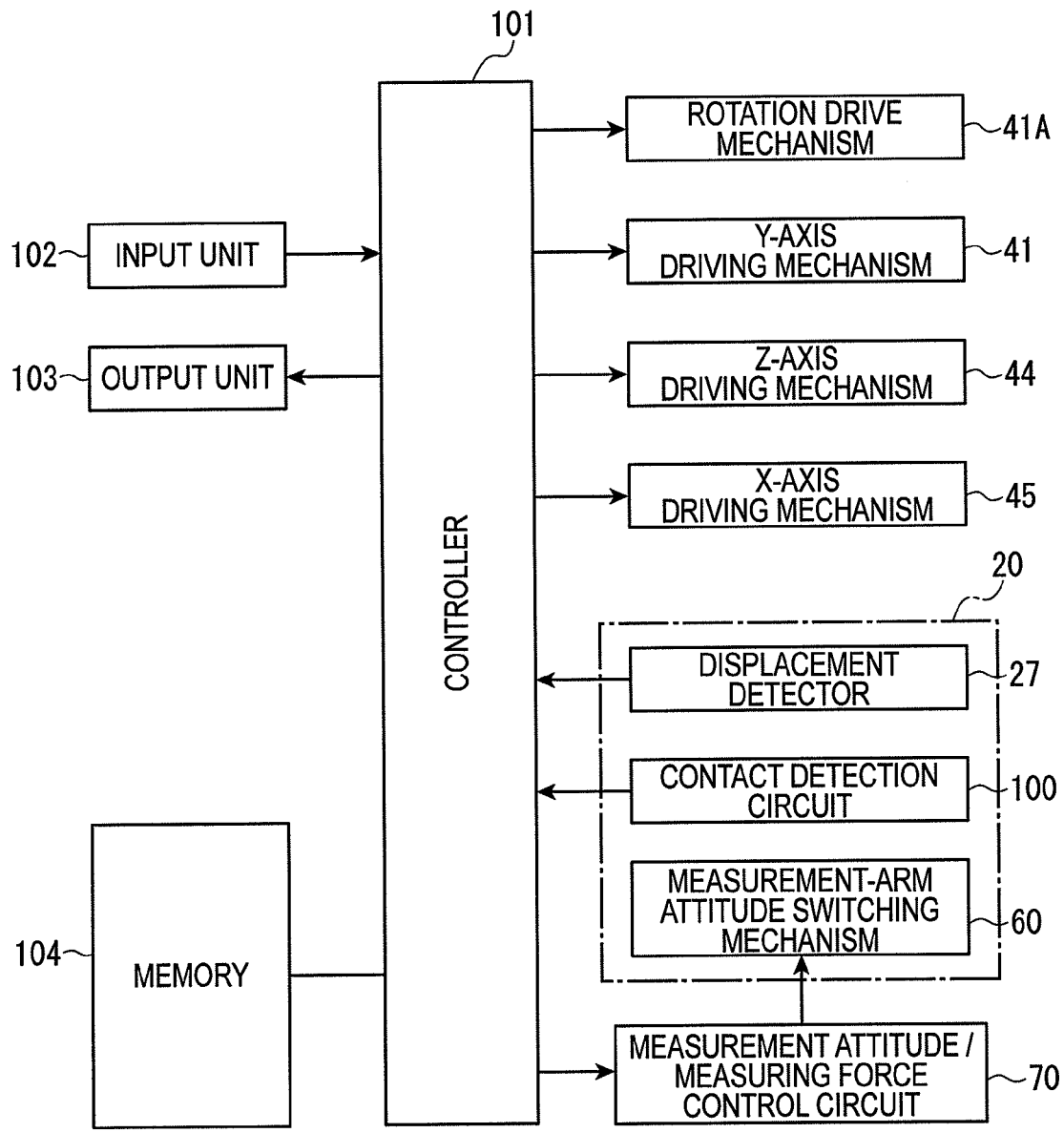
FIG. 17 is a block diagram showing a control system of the profile measuring instrument according to the exemplary embodiment.

FIG. 17 shows a control system of the surface texture measuring instrument according to the exemplary embodiment.

The controller 101 is connected to the rotation drive mechanism 41A, the Y-axis driving mechanism 41, the Z-axis driving mechanism 44, the X-axis driving mechanism 45, the displacement detector 27, contact detection circuit 100, and measurement-arm attitude switching mechanism 60 of the stylus-displacement detector 20, an input unit 102, an output unit 103 and a memory 104 and the like, the measurement-arm attitude switching mechanism 60 being connected to the controller 101 via the measurement attitude/measuring force control circuit 70.

The controller 101 is configured to serve as a drive stopper that stops driving the relative movement mechanism 40 (the rotation drive mechanism 41A, the Y-axis driving mechanism 41, the Z-axis driving mechanism 44 and the X-axis driving mechanism 45) when the contact detection circuit 100 detects separation of any one of the seat sensors 97, 98 and 99. The controller 101 is configured to also serve as a balance adjuster that adjusts balance of the measurement arm 24 by adjusting the electric current passing through the voice coil 62 of the measurement-arm attitude switching mechanism 60 after the second measurement arm 24B is replaced. Specifically, the controller 101 is configured to serve as the balance adjuster that adjusts the electric current passing through the voice coil 62 while monitoring the circular movement amount of the measurement arm 24 detected by the displacement detector 27 and terminates the balance adjustment when the circular movement amount reaches a predetermined value.

Scanning Measurement by Surface Texture Measuring Instrument

As shown in FIG. 18, an object W1 is provided with the female thread S1 (the threaded object). For performing scanning measurement of a thread profile of each of upper and lower internal surfaces of an internal surface of the female thread S1 using the above surface texture measuring instrument, the object W1 is first set on the stage 10 (see FIG. 10) and subsequently the relative movement mechanism 40 is driven to bring the styluses 26A and 26B of the measurement arm 24 into the female thread S1 of the object W1.

While the styluses 26A and 26B are in the female thread S1, the controller 101 outputs a downward switching operation command and the measurement force command. The end of the measurement arm 24 is then biased downward through the measurement attitude/measuring force control circuit 70 and the electric current according to the measurement force command is supplied to the voice coil 62 of the measurement-arm attitude switching mechanism 60.

As a result, the measurement arm 24 is operated at the predetermined speed in a direction by the measurement-arm attitude switching mechanism 60 to bias the end of the measurement arm 24, for instance, downward and the downward stylus 26B is brought into contact with the lower surface of the female thread S1 with the command measurement force. When the stylus-displacement detector 20 and the stage 10 are then relatively moved along a center axis C of the female thread S1 (the X-axis direction) by the relative movement mechanism 40, the displacement detector 27 detects the circular movement amount of the measurement arm 24, which is used to obtain contour data on a thread formed on the lower surface of the female thread S1 (see the contour F1 in FIG. 4).

Next, the controller 101 outputs an upward switching operation command and the measurement force command. Hereupon, the measurement arm 24 is operated at a preset speed in a direction by the measurement-arm attitude switching mechanism 60 to bias the end of the measurement arm 24 upward and the upward stylus 26A is brought into contact with the upper surface of the female thread S1 with the command measurement force.

Figure 1:
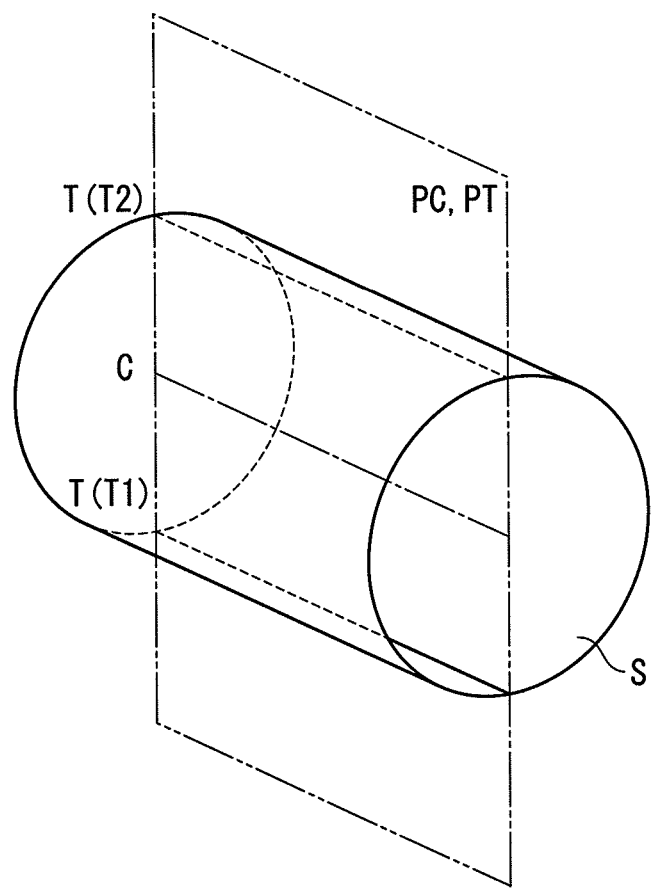
FIG. 1 is a perspective view of a thread profile for explaining a principle of the invention.
Figure 2:
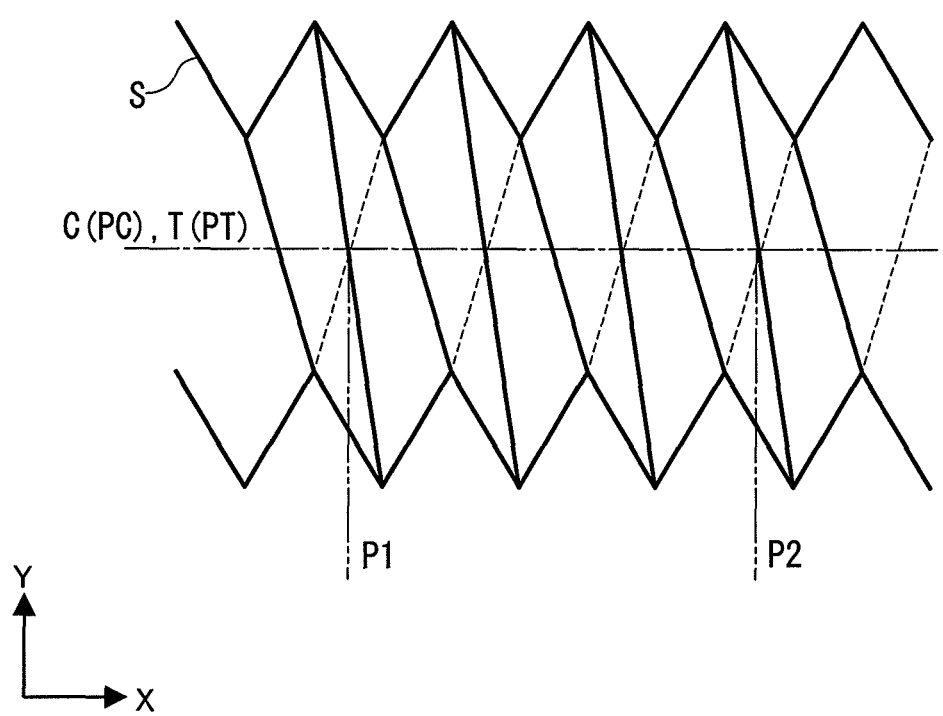
FIG. 2 is a plan view for explaining the principle of the invention, showing that a scanning axis and a center axis coincide with each other.
Figure 3:
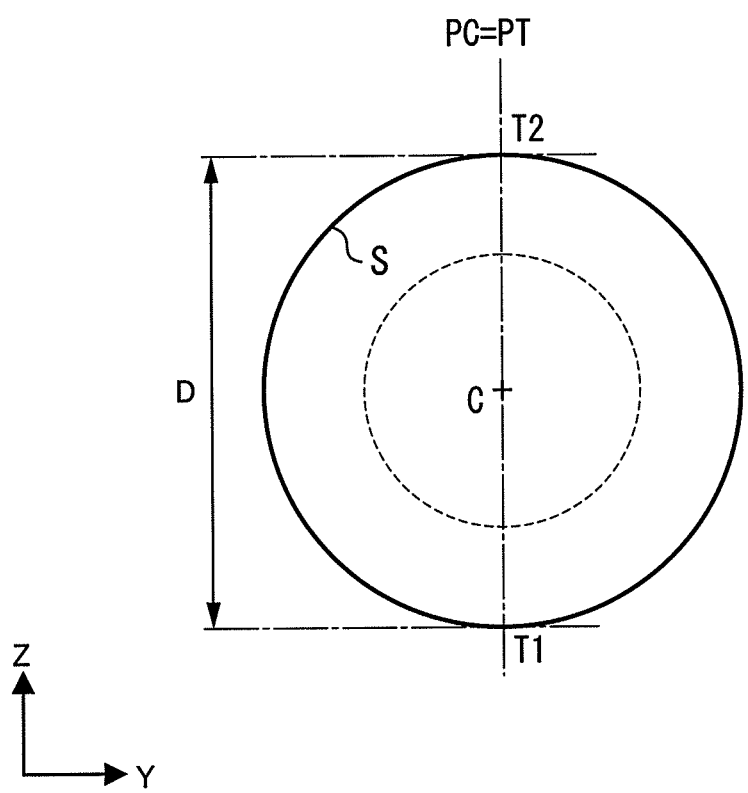
FIG. 3 is a sectional view for explaining the principle of the invention, showing that the scanning axis and the center axis coincide with each other.
Figure 4:
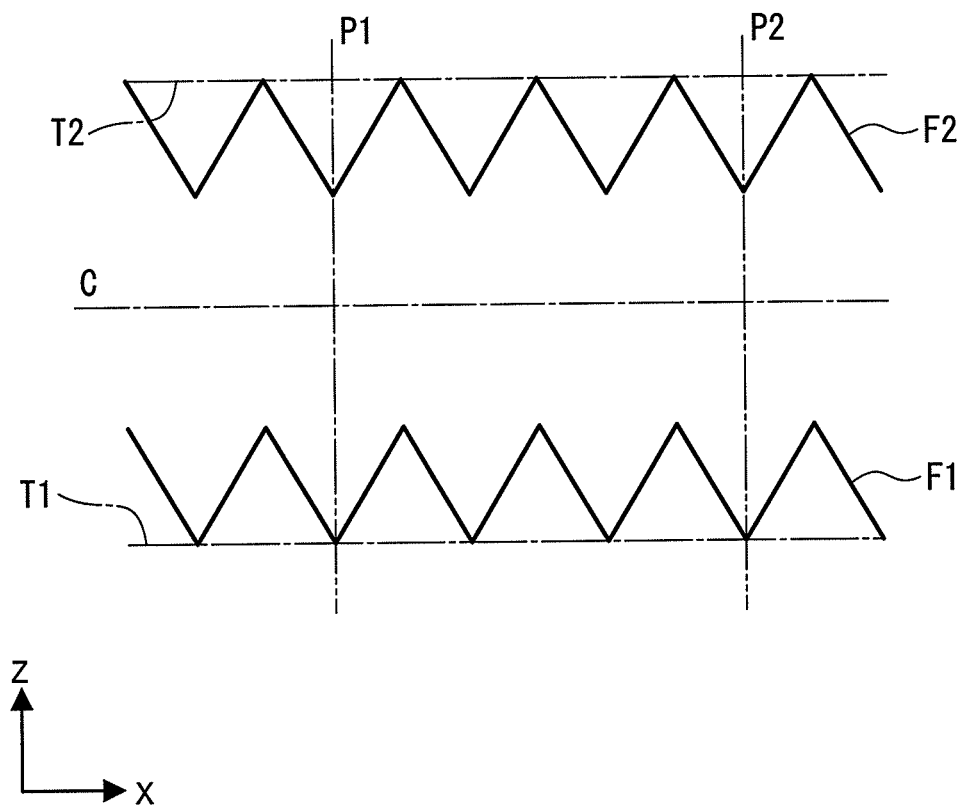
FIG. 4 shows a thread contour obtained by a scanning measurement performed when the scanning axis and the center axis coincide with each other for explaining the principle of the invention.

Then, when the stylus-displacement detector 20 and the stage 10 are relatively moved along the center axis C of the female thread S1 (the X-axis direction) by the relative movement mechanism 40 in the same manner as in the above-described scanning measurement of the lower surface, the displacement detector 27 detects the circular movement amount of the measurement arm 24, which is used to obtain contour data on a thread formed on the upper surface of the female thread S1 (see the contour F2 in FIG. 4).

Attitude Adjustment for Scanning Measurement

The scanning measurement of the female thread S1 using the surface texture measuring instrument as described above requires an attitude adjustment (alignment and vertex detection) of the object W1 relative to the surface texture measuring instrument for accurately aligning the center axis C and a scanning axis T with each other.

Specifically, after the object W1 is set on the stage 10 (see FIG. 10), an attitude of the object W1 (an orientation in the α-direction in relation to inclination and a position in the Y-axis direction in relation to axis deviation) is adjusted by the relative movement mechanism 40 (the rotation drive mechanism 41A and the Y-axis driving mechanism 41) so that the center axis C of the female thread S1 coincides with the scanning axis T (the X-axis direction) used for the scanning measurement performed by the surface texture measuring instrument.

According to the exemplary embodiment, for the attitude adjustment of the object W1, the alignment and the vertex detection are performed in accordance with a process based on the invention (see FIG. 19).

First, the styluses 26A and 26B of the measurement arm 24 of the surface texture measuring instrument are inserted into the female thread S1 of the object W1 (threaded object) (see FIG. 18) and then the scanning measurement is performed at two positions (peak and bottom) in upper and lower surfaces, which face each other across the center axis C, along scanning axes T1 and T2 (step S11 in FIG. 19).

Next, while the contours F1 and F2 are obtained from the contour data obtained by the scanning measurement along the scanning axes T1 and T2, two points P1 and P2 (first position and second position) spaced from each other by a distance L on the center axis C are set and then thread displacements dX1 and dX2 at the two points P1 and P2 on the contours F1 and F2 are detected, the thread displacements dX1 and dX2 being defined in directions of the scanning axes T1 and T2, respectively (step S12 in FIG. 19).

Further, the detected thread displacements dX1 and dX2 are used to calculate an inclination θ and a deviation dY of the scanning axis T of the surface texture measuring instrument from the center axis C of the female thread S1 (step S13 in FIG. 19).

The inclination θ and the deviation dY are calculated herein as follows.

Figure 5:
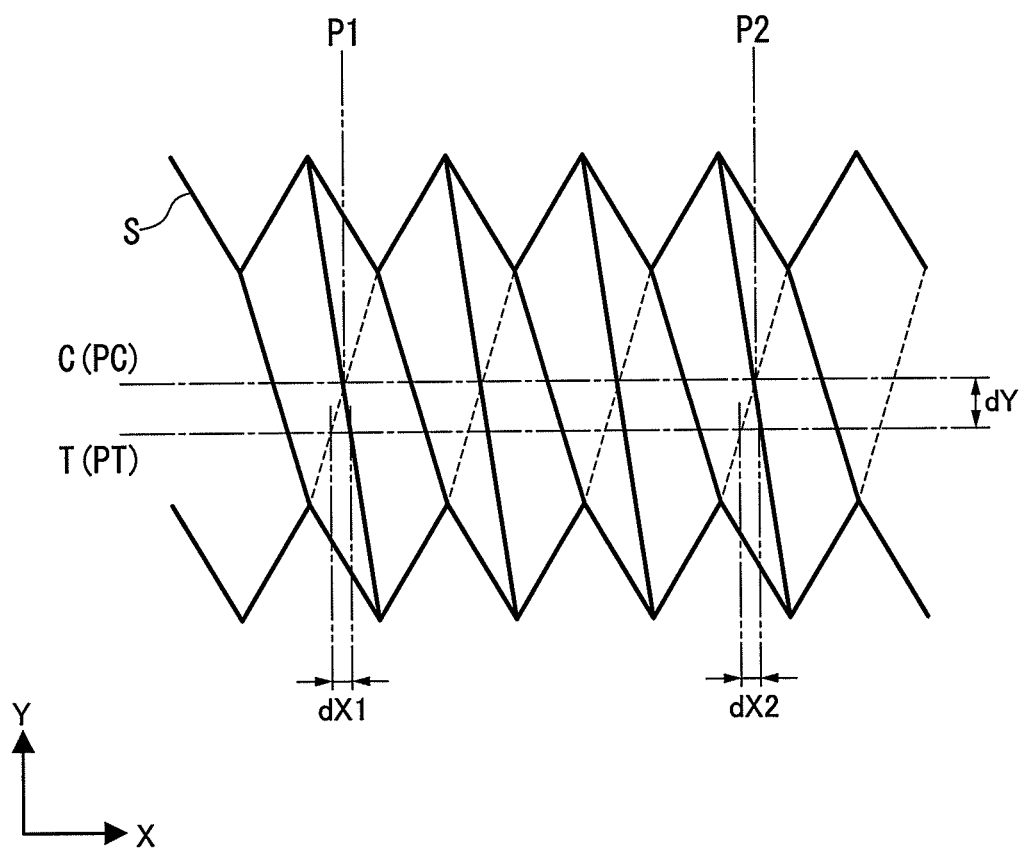
FIG. 5 is a plan view for explaining the principle of the invention, showing that the scanning axis and the center axis are deviated from each other.
Figure 6:
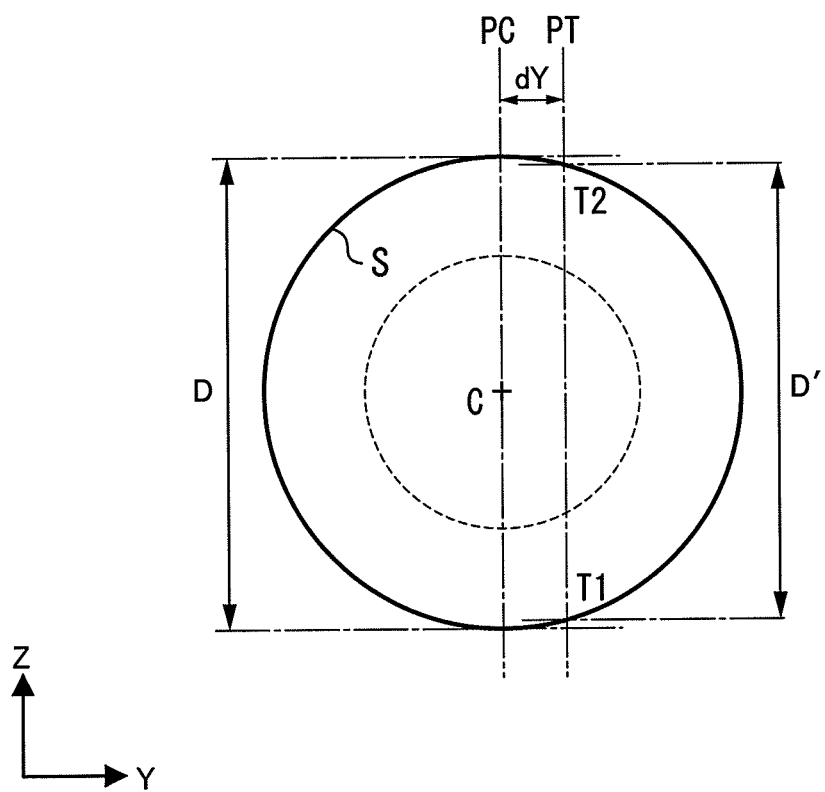
FIG. 6 is a sectional view for explaining the principle of the invention, showing that the scanning axis and the center axis are deviated from each other.

As shown in FIG. 20, when seen in a planar shape of the female thread S1 (XY plane), the scanning axis T (and a plane PT) (see the above description in relation to FIG. 5, etc.) is inclined by the inclination θ and also deviated by the deviation dY from the center axis C (and a plane PC) (see the above description in relation to FIG. 5, etc.) that passes through the center of the threaded object S.

Figure 7:
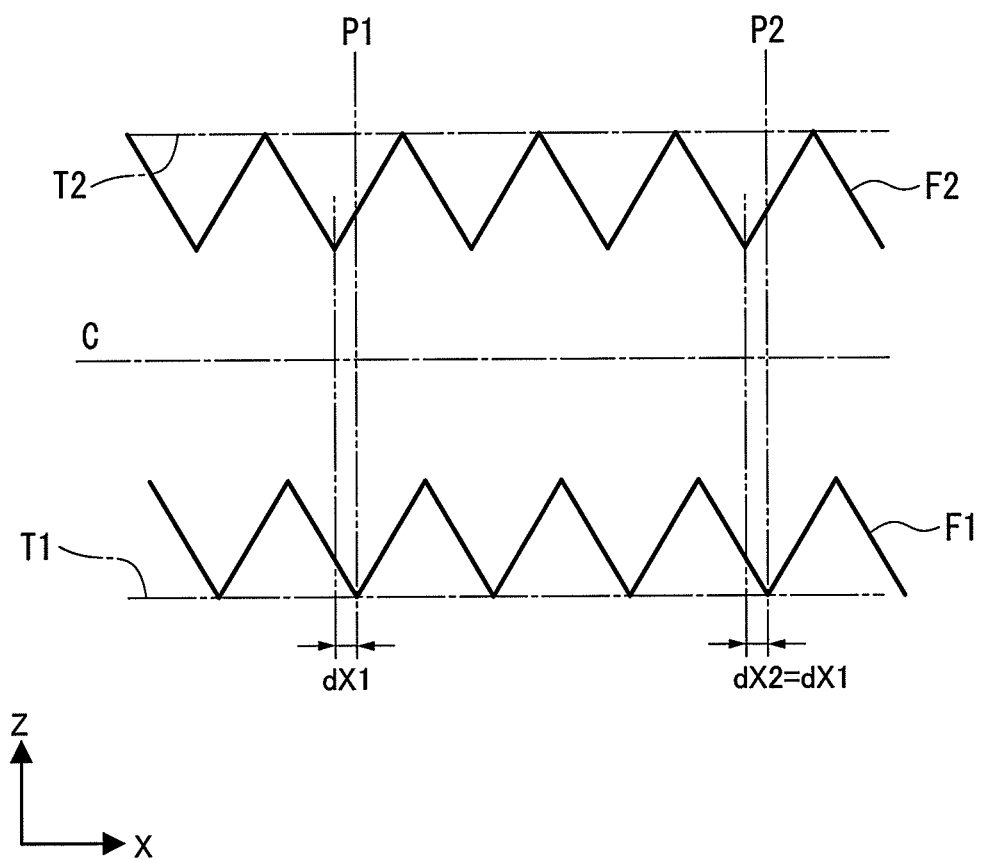
FIG. 7 shows a thread contour obtained by a scanning measurement performed when the scanning axis and the center axis are deviated from each other for explaining the principle of the invention.
Figure 8:
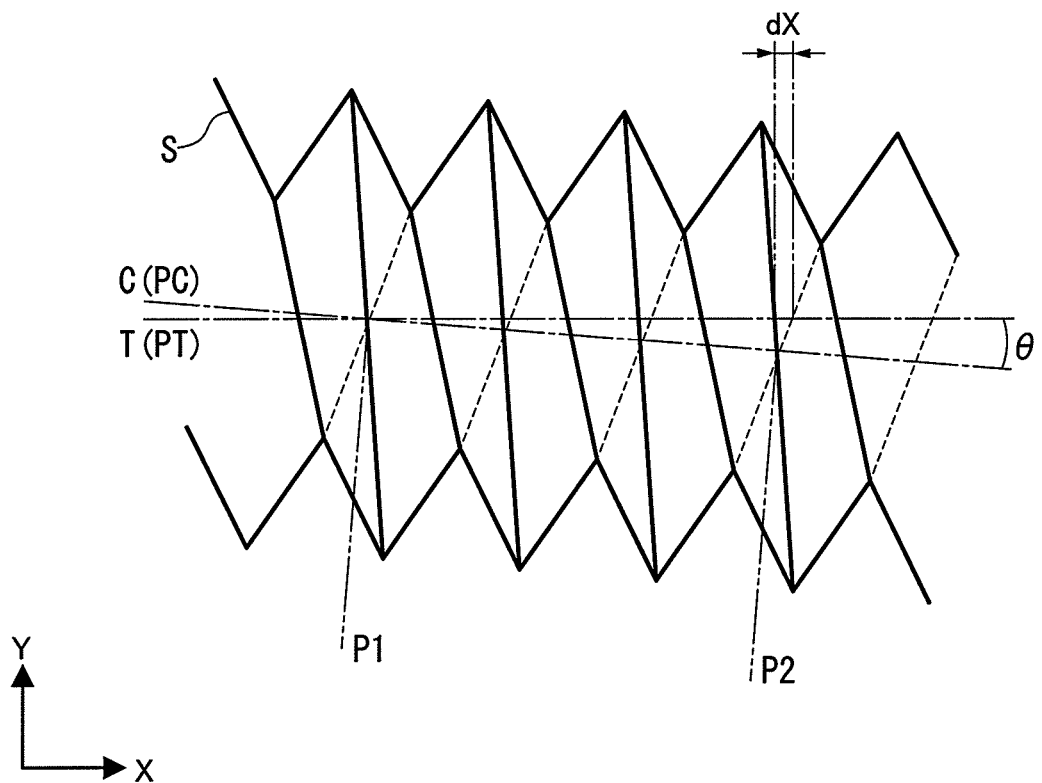
FIG. 8 is a plan view for explaining the principle of the invention, showing that the scanning axis and the center axis are inclined from each other.
Figure 9:
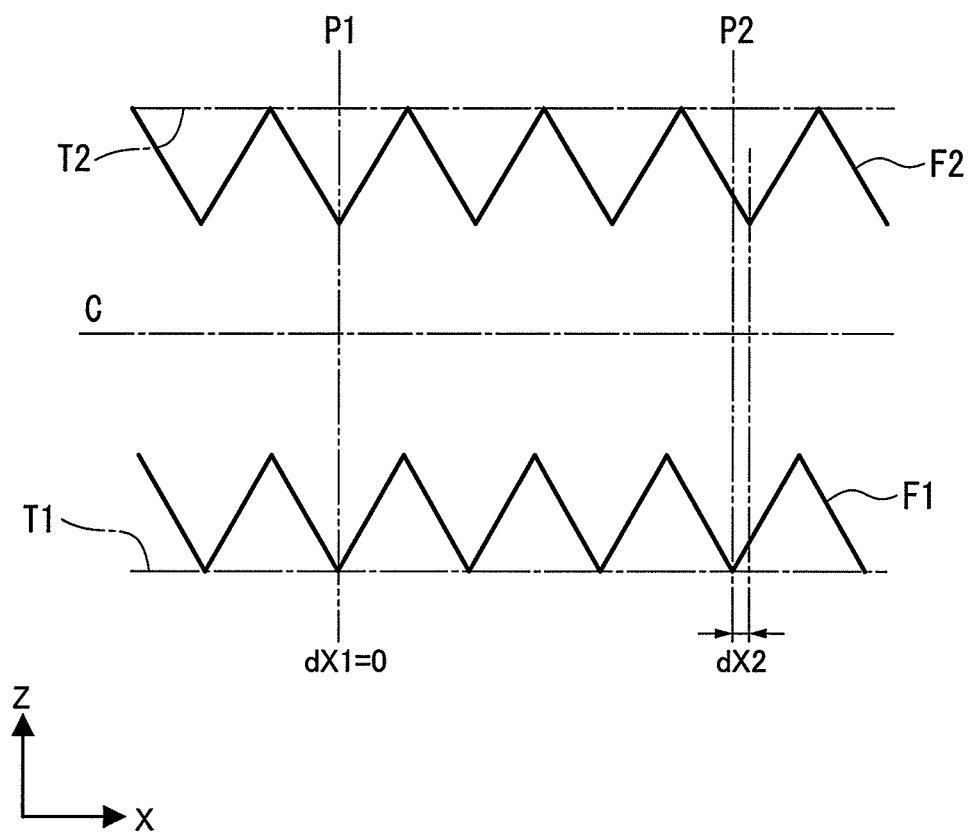
FIG. 9 shows a thread contour obtained by a scanning measurement performed when the scanning axis and the center axis are inclined from each other for explaining the principle of the invention.

Because of such inclination and axis deviation, the contours F1 and F2 obtained by the above-described scanning measurement (see the above description in relation to FIGS. 7 and 9) have the thread displacements dX1 and dX2 at the two points P1 and P2 spaced from each other by the distance L.

The thread displacements dX1 and dX2 can be trigonometrically calculated using a standard thread lead angle β for the female thread S1 as follows.

As also shown in FIG. 21, the points P1 and P2 have the thread displacements dX1 and dX2 along the scanning axis T, respectively.

Assuming that the scanning axis T is deviated from the center axis C at the points P1 and P2 by axis deviations dY1 and dY2, respectively, the axis deviations dY1 and dY2 may be represented as follows.

$$dY1 \approx dX1/2 \cdot \tan \beta \quad (1)$$

$$dY2 \approx dX2/2 \cdot \tan \beta \quad (2)$$

More precisely, the axis deviations dY1 and dY2 are represented as follows using thread displacements dX1' and dX2' defined along the center axis C in relation to the points P1 and P2, respectively.

$$dY1 = dX1'/2 \cdot \tan \beta \quad (3)$$

$$dY2 = dX2'/2 \cdot \tan \beta \quad (4)$$

However, in view of the fact that dX1'=dX1·cos θ and dX2'=DX2·cos θ and that the inclination θ is slight, since cos θ≈1, the axis deviations dY1 and dY2 may be approximated as in the above-described equations (1) and (2).

The axis deviation dY may be considered as a translation component, from which an inclination component related to the inclination θ is removed, and be calculated as an average of the above-described dY1 and dY2, i.e., a deviation at the middle of the distance L.

$$\begin{aligned} dY &= (dY1 + dY2)/2 \\ &= (dX1 + dX2)/4 \cdot \tan\beta \end{aligned} \quad (5)$$

The inclination θ is a gradient defined by a difference between dY1 and dY2 divided by the distance L and thus may be calculated as follows.

$$L \cdot \tan\theta = (dY1 - dY2) \quad (6)$$

$$\begin{aligned} \theta &= \tan^{-1}(dY1 - dY2)/L \\ &= \tan^{-1}(dX1 - dX2)/L \cdot 2 \cdot \tan\beta \end{aligned} \quad (7)$$

After the inclination θ and the deviation dY are calculated by the above equations, a termination determination is performed depending on a requirement.

In the termination determination, judgment may be made on any one of the following: whether or not the inclination θ and the deviation dY satisfy a predetermined accuracy requirement; whether or not an adjustment in step S15 (described later) is repeated for a predetermined number of times or more; and whether or not an operator requests termination of the process (step S14 in FIG. 19).

When the above requirement is not satisfied in step S14, for instance, when either one of the inclination θ and the deviation dY exceeds a predetermined reference value, an adjustment is made as follows: the stage 10 and object W1 are rotated around an α-axis to eliminate the inclination θ by the rotation drive mechanism 41A of the surface texture measuring instrument and also moved by the Y-axis driving mechanism 41 to eliminate the deviation dY.

On the other hand, when the requirement is satisfied in step S14, without adjusting the inclination θ and the deviation dY, the contours F1 and F2 obtained in the current adjustment state through the scanning measurement are provided as a measurement result and the characteristic values of the thread profile of the female thread S1 (shape, pitch diameter and the like) are calculated based on the contours F1 and F2.

Effects of Exemplary Embodiment

According to the above exemplary embodiment, the process proceeds as follows: the scanning measurement is performed to obtain contour data (the contours F1 and F2) in relation to the first axis T1 and the second axis T2; the contour data is used to obtain the displacements dX1 and dX2 (defined in the axial directions of T1 and T2) between the thread crests and the thread roots on the first axis T1 and second axis T2 at the first position P1 and the second position P2; and an inclination component is extracted from the difference between the displacements dX1 and dX2 to calculate the inclination θ while the displacements dX1 and dX2 at the first position P1 and the second position P2 are averaged and a common axis-deviation component is extracted to calculate the deviation dY.

For calculating the inclination θ and the deviation dY, a geometric approximation or the like may be included as needed to simplify the process depending on a required accuracy. In contrast, an exact calculation of the inclination θ and the deviation dY results in an improved calculation accuracy. The accuracy may be determined depending on a required accuracy in measurement of the thread profile, so that it is possible to appropriately change a balance between simplification of the device and process and improvement of the accuracy of the device and process.

In particular, according to the exemplary embodiment, the standard thread lead angle β for the thread profile of the female thread S1 may be used for trigonometry to easily calculate the inclination θ and the deviation dY.

Further, the accuracy can be more improved as follows: the attitude of the female thread S1 relative to the surface texture measuring instrument is adjusted in accordance with the calculation results of the inclination θ and the deviation dY obtained after the scanning measurement is performed one time; and the scanning measurement, the calculation of the inclination θ and the deviation dY and/or the adjustment of the attitude are again performed. Additionally, the accuracy can be further more improved by repeating such a process as described above.

According to the exemplary embodiment, the surface texture measuring instrument provided with the swingable arm is used for the scanning measurement of each of the upper and lower surfaces of the female thread S1. The measurement arm 24 includes the pair of styluses 26A and 26B provided on opposite sides in the swinging direction, so that the surface texture measuring instrument is adapted to perform the scanning measurement along the first axis T1 and the second axis T2 with the assistance of the styluses 26A and 26B, respectively. With this arrangement, without, for instance, turning around the female thread S1 or the surface texture measuring instrument, the scanning measurement can be performed along each of the first axis T1 and the second axis T2.

Modification(s)

The invention is not limited to the above exemplary embodiment but may include any modification or the like as long as the modification is compatible with the invention.

In the above exemplary embodiment, the threaded object is exemplified by a female thread but may be a male thread. The characteristic values of the thread profile may include ones defined for each type of thread in accordance with JIS in addition to thread pitch, shape and pitch diameter.

Although the arrangement for the thread profile scanning measurement according to the exemplary embodiment includes the swingable arm provided with the styluses located on both sides defined in the swinging direction so that the scanning measurement can be continuously performed along each of the first axis and the second axis, the thread profile scanning measurement may be performed in a different manner. For instance, a uniaxially movable profile measuring instrument, such as a typical contour measuring instrument, in which a stylus is provided only on one side may be used. A coordinate measuring machine may be used for scanning measurement through a uniaxial movement in place of the profile measuring instrument. A contour measurement is optically performed on the thread profile in a manner that, for instance, a shape of a male thread is projected and the contour is simultaneously measured.

Although the deviation dY and the inclination $\theta$ are trigonometrically calculated from the contour data obtained through the scanning measurement using the thread displacements dX1 and dX2, the distance L between the first position P1 and the second position P2 and the thread lead angle $\beta$ of the female thread S1 in the above exemplary embodiment, a formula different from the equation (5) for the deviation dY and the equation (7) for the inclination described above may be used.

Although for the termination determination, judgment may be made on any one of whether or not the accuracy of each of the inclination $\theta$ and the deviation dY reaches a desired level, whether or not the adjustment is repeated for a predetermined number of times or more, or whether or not an operator requests termination, the details of the requirements or the like may be appropriately determined when the process is actually carried out and several requirements may be combined.

According to the exemplary embodiment, the standard thread lead angle $\beta$ for the thread profile of the female thread S1 is used for trigonometry to easily calculate the inclination $\theta$ and the deviation dY. The thread lead angle $\beta$ may be inputted into the controller 101 by an operator in accordance with the standard for a thread profile to be measured, or, alternatively, a data table regarding the thread lead angle $\beta$ made in accordance with the standard may be stored in the controller 101 in advance and referred to as needed.

However, the thread lead angle $\beta$ is not necessarily inputted or referred to according to the invention but may be calculated from an actual value of a thread profile to be measured during the measurement according to the exemplary embodiment.

For instance, a "thread lead angle measurement" is performed as follows. First, while the center axis C and the scanning axis T are deviated from each other (in an unadjusted state), step S11 in FIG. 19 is performed to obtain the contour along each of the first axis T1 and the second axis T2.

A pitch P (preferably, an average of values at plural points) of the thread profile is calculated from an interval between the thread crests on the first axis T1 or the second axis T2 and an outside diameter D of the thread profile is also calculated.

The thread lead angle $\beta$ can be calculated from the pitch P and the outside diameter D by an equation, $\beta = \text{Tan}^{-1}(P/\pi D)$.

Subsequently, a "preliminary measurement" is performed as follows. First, steps S11 to S13 in FIG. 19 described above are performed on the thread profile in which the center axis C and the scanning axis T are deviated. In step S13, the thread lead angle $\beta$, which is previously calculated, is used to calculate preliminary values of the inclination $\theta$ and the deviation dY. Based on the calculated preliminary values of the inclination $\theta$ and the deviation dY, step S15 in FIG. 19 is performed to "preliminarily adjust" the deviation between the center axis C and the scanning axis T in the thread profile.

Since the thread lead angle $\beta$ calculated while the deviation is unadjusted is used for the preliminary adjustment, the deviation cannot be properly adjusted through the preliminary adjustment.

However, when steps S11 to S15 in FIG. 19 are repeated for an "actual adjustment" after the preliminary adjustment, an error can be eliminated to achieve a state that can satisfy the requirement in step S14 and then the characteristic values of the thread profile are calculated in step S16.

Using an operation program stored in the controller 101, steps S11 to S16 according to the exemplary embodiment may be fully automatically performed. Of course, a part of the process may be manually performed.

For instance, when the stage 10 is of a manual type, an operator may manually perform step S15 (adjustment of the inclination $\theta$ and the deviation dY). In this case, the process may be altered as follows: the inclination $\theta$ and the deviation dY calculated through steps S11 to S13 are shown on a display; an operator makes adjustment while checking the display; and the scanning measurement (step S11) is again performed.

Alternatively, the process may be altered as follows: the thread displacements dX1 and dX2 obtained in step S12 are displayed or outputted as data; and an operator performs step S13 using a different calculation method or the like and makes adjustment based on the calculated inclination $\theta$ and the deviation dY.

As described above, a part or entirety of the process according to the invention may be automatically performed by the controller or may be manually performed by an operator.

Although the inclination and the deviation are first calculated and then the thread profile is actually moved to adjust the attitude of the thread profile so that the thread profile in a proper attitude is measured in the exemplary embodiment, such an actual adjustment of the thread profile is not necessarily required according to the invention and thus, alternatively, the measurement data may be corrected for adjusting the attitude.

Specifically, the process may be altered as follows: the inclination and the deviation are calculated in advance; the thread profile is measured without adjusting the attitude of the thread profile; and measurement data is corrected with reference to the inclination and the deviation calculated in advance for calculating the characteristic values of the thread profile.

Such a process is based on the fact that when a thread profile to be measured is formed exactly in accordance with JIS or ISO (i.e., having the design value), the thread profile should have a known three-dimensional shape. Thus, for instance, when a curve is subjected to the scanning measurement in step S11, it is possible to estimate which portion of the thread profile has a sectional curve corresponding to this measured curve and to compare a theoretical value of the thread profile obtained along the measurement path and a parameter value obtained from the measured curve (a calculated value such as an outside diameter and pitch).

However, a thread profile to be measured does not actually have an ideal shape, so that the accuracy can be improved by repeating the scanning measurement and the calculation for plural times. In particular, although the measurement is performed only at the two points P1 and P2 in the above exemplary embodiment, the measurement may be performed at more points for a statistical purpose to ensure a practical accuracy.

What is claimed is:

1. A thread profile measuring method comprising:
   scanning a thread along a first axis and a second axis extending along a center axis of the thread to obtain contour data of the thread, the first axis and second axis being opposed to each other across the center axis;
   detecting a first distance of thread displacement along the center axis between a thread crest on the first axis and a thread root on the second axis at a first position on the center axis;
   detecting a second distance of thread displacement along the center axis between a thread crest on the first axis and a thread root on the second axis at a second position on the center axis;
   calculating an inclination and a deviation of the first axis and the second axis from the first distance of thread displacement detected at the first position and the second distance of thread displacement detected at the second position; and
   adjusting an attitude of the thread to eliminate the inclination and the deviation.

2. The thread profile measuring method according to claim 1, further comprising trigonometrically calculating the inclination and the deviation using the first and second distances of thread displacements, a distance between the first position and the second position, and a thread lead angle of the thread profile.

3. The thread profile measuring method according to claim 1, further comprising repeating the scanning the thread to obtain the contour data, the calculating of the inclination and the deviation and the adjusting of the attitude of the thread profile until any one of whether or not an accuracy of the inclination and the deviation reaches a predetermined level, whether or not the obtaining, the calculating and the adjusting are repeated for a predetermined number of times or more, and whether or not an operator requests termination.

4. The thread profile measuring method according to claim 1, wherein
   the scanning measurement is performed on the thread profile using a profile measuring instrument comprising a swingable arm,
   the arm comprises a pair of styluses provided on opposite sides in a swinging direction, and
   the profile measuring instrument is adapted to perform the scanning measurement along the first axis and the second axis with the styluses.

* * * * *